United States Patent
Pancholi et al.

(10) Patent No.: US 11,276,125 B2
(45) Date of Patent: Mar. 15, 2022

(54) SYSTEMS AND METHODS FOR ASSESSING ECONOMIC FEASIBILITY OF AN ENERGY PLANT

(71) Applicant: Johnson Controls Tyco IP Holdings LLP, Milwaukee, WI (US)

(72) Inventors: Payal Pancholi, Navi Mumbai (IN); Abhishek Gupta, Pune (IN); James P. Kummer, Wales, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

(21) Appl. No.: 16/655,745

(22) Filed: Oct. 17, 2019

(65) Prior Publication Data

US 2020/0126164 A1 Apr. 23, 2020

(30) Foreign Application Priority Data

Oct. 18, 2018 (IN) .............................. 201821039497

(51) Int. Cl.
*G06Q 40/00* (2012.01)
*G06Q 10/06* (2012.01)
*G06F 30/13* (2020.01)

(52) U.S. Cl.
CPC .......... *G06Q 40/125* (2013.12); *G06F 30/13* (2020.01); *G06Q 10/0637* (2013.01); *G06Q 10/06315* (2013.01)

(58) Field of Classification Search
CPC ............. G06Q 50/00; G06Q 10/06315; G06Q 10/0637; G06F 30/13
See application file for complete search history.

(56) References Cited

U.S. PATENT DOCUMENTS

| 7,788,189 B2 | 8/2010 | Budike, Jr. |
| 10,418,833 B2 | 9/2019 | Wenzel et al. |
| 2007/0150333 A1 | 6/2007 | Hurst et al. |
| 2015/0149257 A1 | 5/2015 | Bielat et al. |
| 2015/0316907 A1 | 11/2015 | Elbsat et al. |
| 2015/0331972 A1* | 11/2015 | McClure ................ G06F 17/11 703/2 |
| 2017/0011150 A1* | 1/2017 | Sons ..................... G06F 30/13 |

OTHER PUBLICATIONS

U.S. Appl. No. 16/370,632, filed Mar. 20, 2019, Johnson Controls Technology Company.

* cited by examiner

*Primary Examiner* — A. Hunter Wilder
(74) *Attorney, Agent, or Firm* — Foley & Lardner LLP

(57) ABSTRACT

Systems and methods for generating graphical elements in a user interface are shown according to various embodiments. Various plant designs may be simulated under scenario conditions to predict energy usage and cost. A user may indicate to perform an economic feasibility analysis for one or more simulated plant designs. Financial performance data may be generated for the one or more plant designs according to one or more analysis parameters. Financial performance data may be a Net Present Value, Internal Rate of Return, or Payback period. A graphical element may be generated in a user interface to present the generated financial performance data. Financial performance data may be compared to threshold values to determine if the plant design is acceptable. Financial performance data can be compared for different plant designs to choose the optimal plant design.

18 Claims, 13 Drawing Sheets

FIG. 10

FINANCIAL PERFORMANCE CALCULATOR

<< Back — 1016

Simulation — 1002
pv.Of_HighLevel_HighOccupancy

Define Performance Parameters

Baseline Cost($)* — 1004
300000

Savings($) — 1006
250,334.67

First Year Maintenance Cost($)* — 1004
30000

Discount Rate(%)* — 1004
10

No. of Forcast Years — 1004
10

First Year Cost($)
300000 — 1006

Savings Escalation(%)*
10

Maintenance Cost Escalation(%)*
10

Initial Cost($)*
25000

Reset — 1012    Calculate — 1010

View Cash Flow — 1014

1,978,042.49 NPV
Net Present Value 792.62 IRR
Internal Rate of Return 0.11 Years
Payback — 1018

Sidebar:
- Search
- Project List
  - UW Madison
    - Model Editor
      - Model 1
      - Model 2
    - Data Editor
    - Scenario Editor
    - Simulation
    - Results
    - Financial Performance

1000

SYSTEMS AND METHODS FOR ASSESSING ECONOMIC FEASIBILITY OF AN ENERGY PLANT

CROSS-REFERENCE TO RELATED PATENT APPLICATIONS

The present application claims priority to and the benefit of Indian Provisional Patent Application No. 201821039497, filed Oct. 18, 2018, which is incorporated herein by reference in its entirety.

BACKGROUND

The present disclosure relates generally to a central plant or central energy facility configured to serve the energy loads of a building or campus. The present disclosure relates more particularly to determining an optimal configuration of a central plant from various plant designs using simulation data.

A central plant typically include multiple subplants configured to serve different types of energy loads. For example, a central plant may include a chiller subplant configured to serve cooling loads, a heater subplant configured to serve heating loads, and/or an electricity subplant configured to serve electric loads. A central plant purchases resources from utilities to run the subplants to meet the loads.

A central plant can be designed and simulated digitally to optimize performance under various loads and conditions. Several plant designs can be compared against each with respect to total energy usage and/or energy efficiency. However, the most energy-efficient plant design may not necessarily be the most economically feasible. Rather, an investment appraisal analyzing the long-term profitability of a plant design is needed to determine if the plant design is worth implementing.

SUMMARY

Several embodiment of the disclosure relate to a computing system, the computing system comprising one or more computer-readable storage media having instructions stored thereon that, when executed by one or more processors, cause the one or more processors to perform specific operations. The system may be configured to generate a first graphical element to a user via a user interface. The first graphical element may comprise simulation results performed by a simulator for various central plant designs and scenario conditions. The system may be configured to receive a user indication to display financial performance data for the central plant design. The system may be configured to generate the financial performance data for the simulated plant design. The system may be configured to generate a second graphical element comprising the generated financial performance data.

In some embodiments, the financial performance data is a net present value, internal rate of return, a payback period, or a cash flow.

In some embodiments, the second graphical element presents the financial performance data in a chart, bar graph, or line graph.

In some embodiments, the financial performance data is based on simulation data, the simulation data comprising a principle cost or an operating cost of the plant design.

In some embodiments, the system can be configured to receive a second user input, the second user input comprising a value for an analysis parameter used to generate the financial performance data.

In some embodiments, the analysis parameter is an evaluation period, baseline cost, required rate of return, discount rate, or escalation rate.

In some embodiments, the financial performance data is compared to a threshold value, and the financial performance data is presented in a style indicative of the comparison between the financial performance data and the threshold value.

In some embodiments, the system can be configured to compare the financial performance data of two or more simulated central plant designs.

Several other embodiments of the disclosure related to a method. The method may comprise generating a first graphical element to a user via a user interface. The first graphical element may comprise simulation results performed by a simulator for various central plant designs and scenario conditions. The method may comprise receiving a user indication to display financial performance data for the central plant design. The method may comprise generating the financial performance data for the simulated plant design. The method may comprise generating a second graphical element comprising the generated financial performance data.

In some embodiments, the financial performance data is a net present value, internal rate of return, a payback period, or a cash flow.

In some embodiments, the second graphical element presents the financial performance data in a chart, bar graph, or line graph.

In some embodiments, the financial performance data is based on simulation data, the simulation data comprising a principle cost or an operating cost of the plant design.

In some embodiments, the method may comprise receiving a second user input, the second user input comprising a value for an analysis parameter used to generate the financial performance data.

In some embodiments, the analysis parameter is an evaluation period, baseline cost, required rate of return, discount rate, or escalation rate.

In some embodiments, the financial performance data is compared to a threshold value, and the financial performance data is presented in a style indicative of the comparison between the financial performance data and the threshold value.

In some embodiments, the system can be configured to compare the financial performance data of two or more simulated central plant designs.

Several embodiment of the disclosure relate to a computing system, the computing system comprising one or more computer-readable storage media having instructions stored thereon that, when executed by one or more processors, cause the one or more processors to perform specific operations. The system may be configured to generate a first graphical element to a user via a user interface. The first graphical element may comprise financial performance data for one or more plant designs. The system may be configured to receive user input for a new value of an analysis parameter used to generate the financial performance data. The system may be configured to generate new financial performance data based on the new value of the analysis parameter. The system may be configured to generate a second graphical element in the user interface, the second graphical element comprising the new financial performance data.

In some embodiments, the financial performance data is a net present value, internal rate of return, a payback period, or a cash flow.

In some embodiments, the analysis parameter is an evaluation period, baseline cost, required rate of return, discount rate, or escalation rate.

In some embodiments, the system is configured to generate the new financial performance data based on the first analysis parameter and a second analysis parameter, the value of the second analysis parameter determined from simulation data associated with the plant design.

BRIEF DESCRIPTION OF THE DRAWINGS

FIG. 10 is another illustration of a user interface associated with the planning tool of FIG. 6, according to some embodiments.

DETAILED DESCRIPTION

Overview

Figure 1:
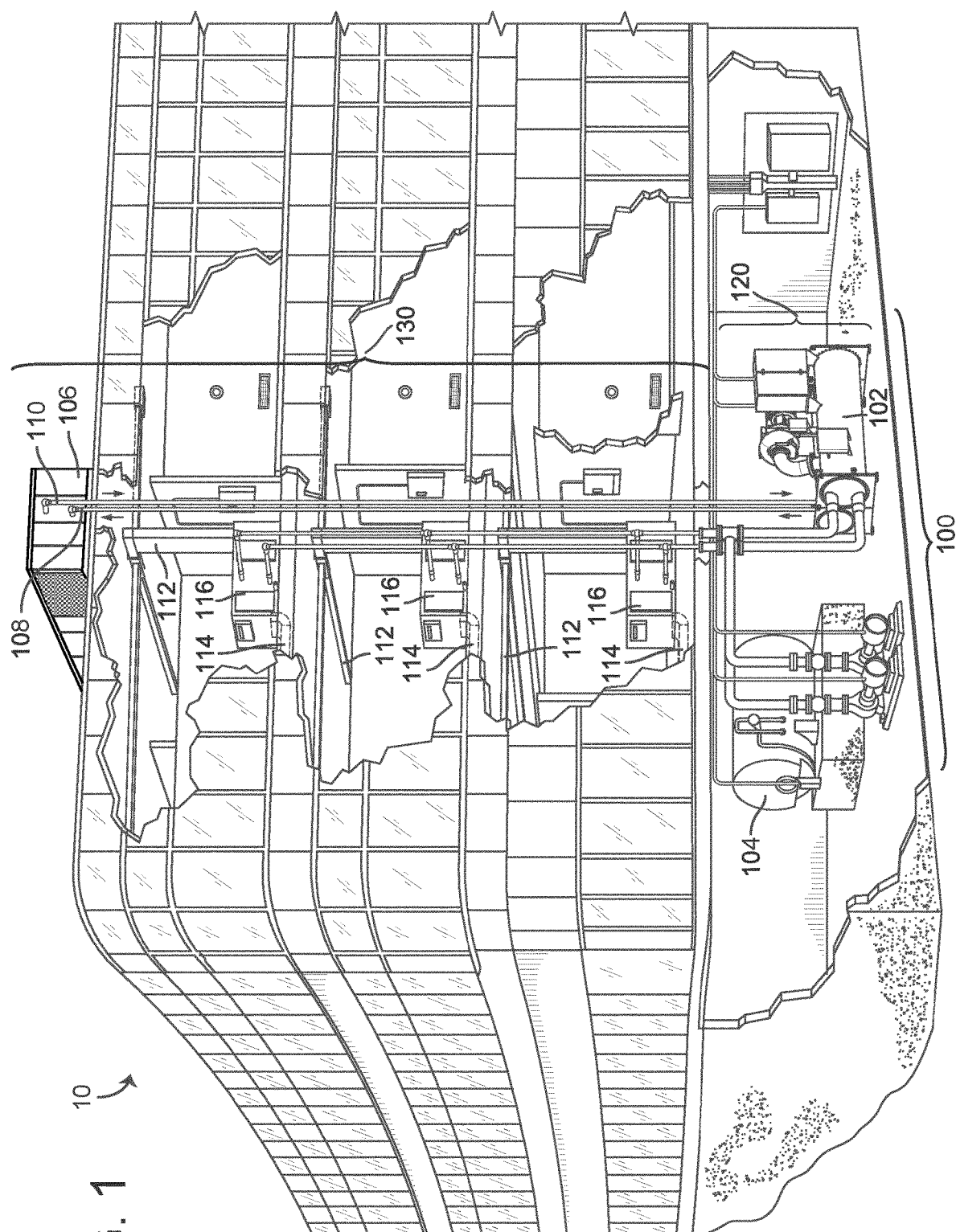
FIG. 1 is a drawing of a building equipped with a HVAC system, according to some embodiments.

Referring generally to the Figures, an economic feasibility platform for analyzing various designs of a central plant is shown, according to various embodiments. The economic feasibility platform can be implemented within a Planning Tool of a Central Plant Optimization (CPO) Program. In some embodiments, the economic feasibility platform can be accessed through a screen "Financial Performance Calculator" in a Planning Tool. The Planning Tool includes a user interface designed to generate and present predictive financial performance data pertaining to the various plant designs and scenarios.

In some embodiments, the Planning Tool is a Cloud based Service-as-a-Service (SaaS) application used to facilitate the design of a central energy plant, the central energy plant including various systems/subsystems such as, for example, a heating system, a cooling, and a power system. The Planning Tool can be part of the CPO (Central Plant Optimization) Program, which targets middle to complex building markets to help customers save energy (estimated over 20%+savings) with industry leading cost-based optimization technologies. For example, The Planning Tool can simulate the design of new central plants; explore the impact of plant retrofits, configuration changes, and future plant expansion; estimate potential energy savings by applying CPO algorithms to an existing plant; simulate plant operation under different scenarios (e.g., weather conditions, load profiles, and utility rate structures). An example of a Planning Tool in a CPO Program is described in U.S. patent application Ser. No. 16/370,632 filed Mar. 29, 2019, the entire disclosure of which is incorporated by reference herein.

The simulation results provided by the Planning Tool can include first year total energy cost, which may render a high level view of how optimized cost could be achieved. However, most of the energy saving projects can only yield benefits in a long term. The first year cost of an energy plant alone may not be enough to evaluate the viability of the plant design used in the Planning Tool. Other considerations, such as which energy supplier to use, seasonal load variances, and time to recoup expenses, suggest a need to understand the year-over-year cost of a plant design. Evaluating the economic feasibility of an energy project is an essential step and shall be completed prior to setting up an actual central plant design, entering into contracts or purchasing materials and equipment.

As described herein, techniques for investment appraisal (used interchangeably with capital budgeting, economic analysis, economic feasibility analysis) allow a user to analyze the economic feasibility of a plant design by weighting future savings against initial costs over a long evaluation period. Such techniques often use time-phased expense and revenue predictions to evaluate a plant design's profitability. The present disclosure provides a solution that uses standard financial calculation methods and further apply the calculation methods to simulation results provide by the Planning Tool. As such, an improved platform for preliminary economic feasibility assessment can be provided.

The present disclosure provides various embodiments in which the economic feasibility of simulated plant designs can be quickly and seamlessly evaluated in a convenient user interface. By integrating the economic feasibility platform into the CPO program, generated simulation data is readily available and organized for input into an investment appraisal system, removing the need for a user to manually input data across several designs for analysis. In addition, the platform can provide more accurate and in-depth analyses by including more simulation data into the calculation of economic viability metrics, rather than using overly-simplified aggregate values.

Embodiments of the user interface can generate and present financial performance data associated with two or more plant designs, allowing a user to directly compare potential plant designs against one another. Some embodiments of the user interface allow a user to request and view addition financial performance data of a central plant design for more detailed economic analysis. Some embodiments allow a user to dynamically vary one or more analysis parameters to generate updated economic feasibility metrics under different analysis conditions. The disclosed features of the user interface can be used by a user to determine which designs are viable options for implementation and to decide which of the potential designs is the most preferred to implement or investigate further.

Building and HVAC System

Referring now to FIG. 1, a perspective view of a building 10 is shown. Building 10 can be served by a building management system (BMS). A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof. An example of a BMS which can be used to monitor and control building 10 is described in U.S. patent application Ser. No. 14/717,593 filed May 20, 2015, the entire disclosure of which is incorporated by reference herein.

The BMS that serves building 10 may include a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. In some embodiments, waterside system 120 can be replaced with or supplemented by a central plant or central energy facility (described in greater detail with reference to FIG. 2). An example of an airside system which can be used in HVAC system 100 is described in greater detail with reference to FIG. 3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Central Plant

Figure 2:
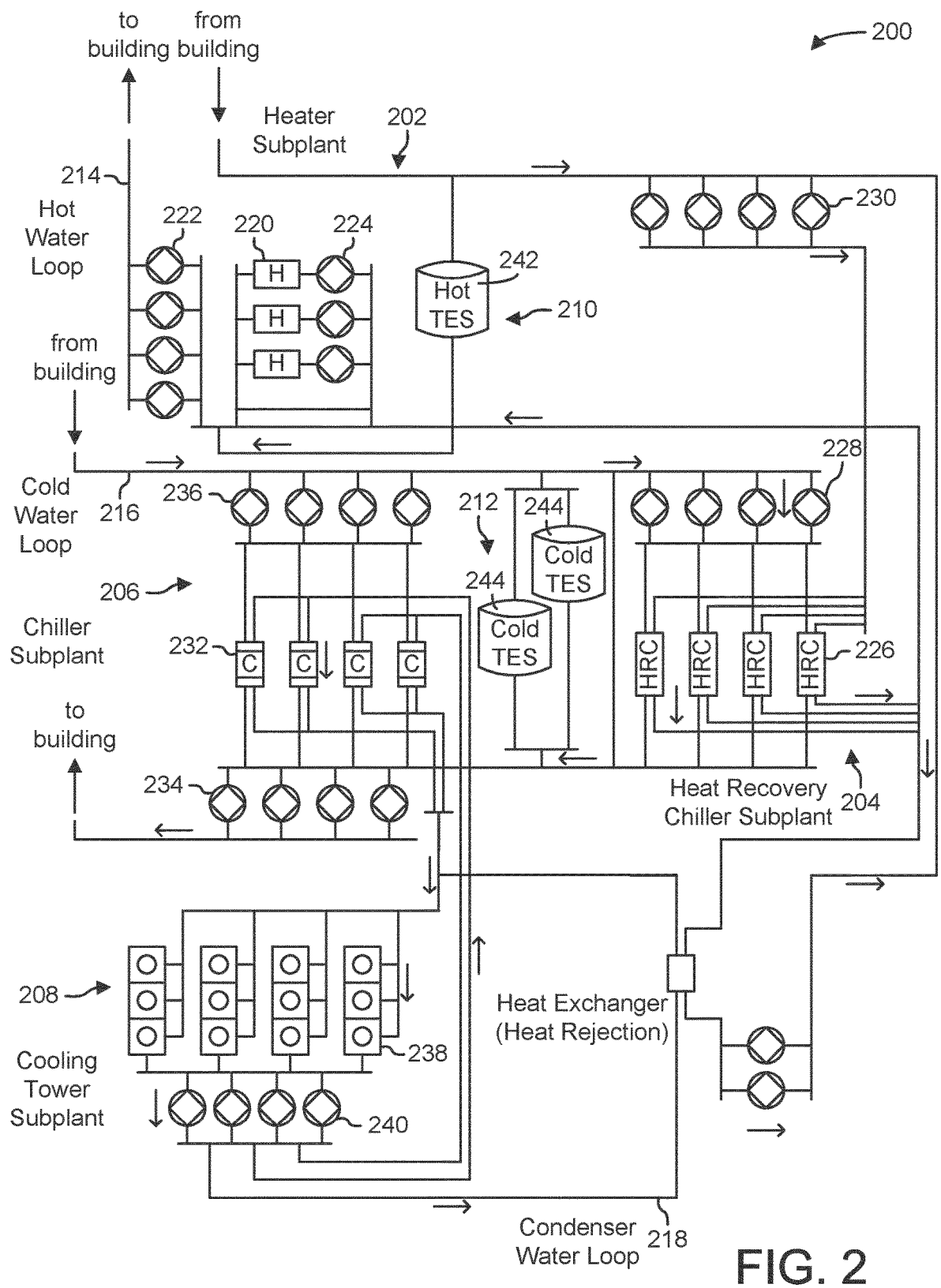
FIG. 2 is a block diagram of a central plant which can be used to serve the energy loads of the building of FIG. 1, according to some embodiments.

Referring now to FIG. 2, a block diagram of a central plant 200 is shown, according to some embodiments. In various embodiments, central plant 200 can supplement or replace waterside system 120 in HVAC system 100 or can be implemented separate from HVAC system 100. When implemented in HVAC system 100, central plant 200 can include a subset of the HVAC devices in HVAC system 100 (e.g., boiler 104, chiller 102, pumps, valves, etc.) and may operate to supply a heated or chilled fluid to AHU 106. The HVAC devices of central plant 200 can be located within building 10 (e.g., as components of waterside system 120) or at an offsite location such as a central energy facility that serves multiple buildings.

Central plant 200 is shown to include a plurality of subplants 202-208. Subplants 202-208 can be configured to convert energy or resource types (e.g., water, natural gas, electricity, etc.). For example, subplants 202-208 are shown to include a heater subplant 202, a heat recovery chiller subplant 204, a chiller subplant 206, and a cooling tower subplant 208. In some embodiments, subplants 202-208 consume resources purchased from utilities to serve the energy loads (e.g., hot water, cold water, electricity, etc.) of a building or campus. For example, heater subplant 202 can be configured to heat water in a hot water loop 214 that circulates the hot water between heater subplant 202 and building 10. Similarly, chiller subplant 206 can be configured to chill water in a cold water loop 216 that circulates the cold water between chiller subplant 206 building 10.

Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. In various embodiments, central plant 200 can include an electricity subplant (e.g., one or more electric generators) configured to generate electricity or any other type of subplant configured to convert energy or resource types.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-208 to receive further heating or cooling.

Although subplants 202-208 are shown and described as heating and cooling water for circulation to a building, it is understood that any other type of working fluid (e.g., glycol, $CO_2$, etc.) can be used in place of or in addition to water to serve thermal energy loads. In other embodiments, subplants 202-208 may provide heating and/or cooling directly to the building or campus without requiring an intermediate heat transfer fluid. These and other variations to central plant 200 are within the teachings of the present disclosure.

Each of subplants 202-208 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

In some embodiments, one or more of the pumps in central plant 200 (e.g., pumps 222, 224, 228, 230, 234, 236, and/or 240) or pipelines in central plant 200 include an isolation valve associated therewith. Isolation valves can be integrated with the pumps or positioned upstream or downstream of the pumps to control the fluid flows in central plant 200. In various embodiments, central plant 200 can include more, fewer, or different types of devices and/or subplants based on the particular configuration of central plant 200 and the types of loads served by central plant 200.

Still referring to FIG. 2, central plant 200 is shown to include hot thermal energy storage (TES) 210 and cold thermal energy storage (TES) 212. Hot TES 210 and cold TES 212 can be configured to store hot and cold thermal energy for subsequent use. For example, hot TES 210 can include one or more hot water storage tanks 242 configured to store the hot water generated by heater subplant 202 or heat recovery chiller subplant 204. Hot TES 210 may also include one or more pumps or valves configured to control the flow rate of the hot water into or out of hot TES tank 242.

Similarly, cold TES 212 can include one or more cold water storage tanks 244 configured to store the cold water generated by chiller subplant 206 or heat recovery chiller subplant 204. Cold TES 212 may also include one or more pumps or valves configured to control the flow rate of the cold water into or out of cold TES tanks 244. In some embodiments, central plant 200 includes electrical energy storage (e.g., one or more batteries) or any other type of device configured to store resources. The stored resources can be purchased from utilities, generated by central plant 200, or otherwise obtained from any source.

Airside System

Figure 3:
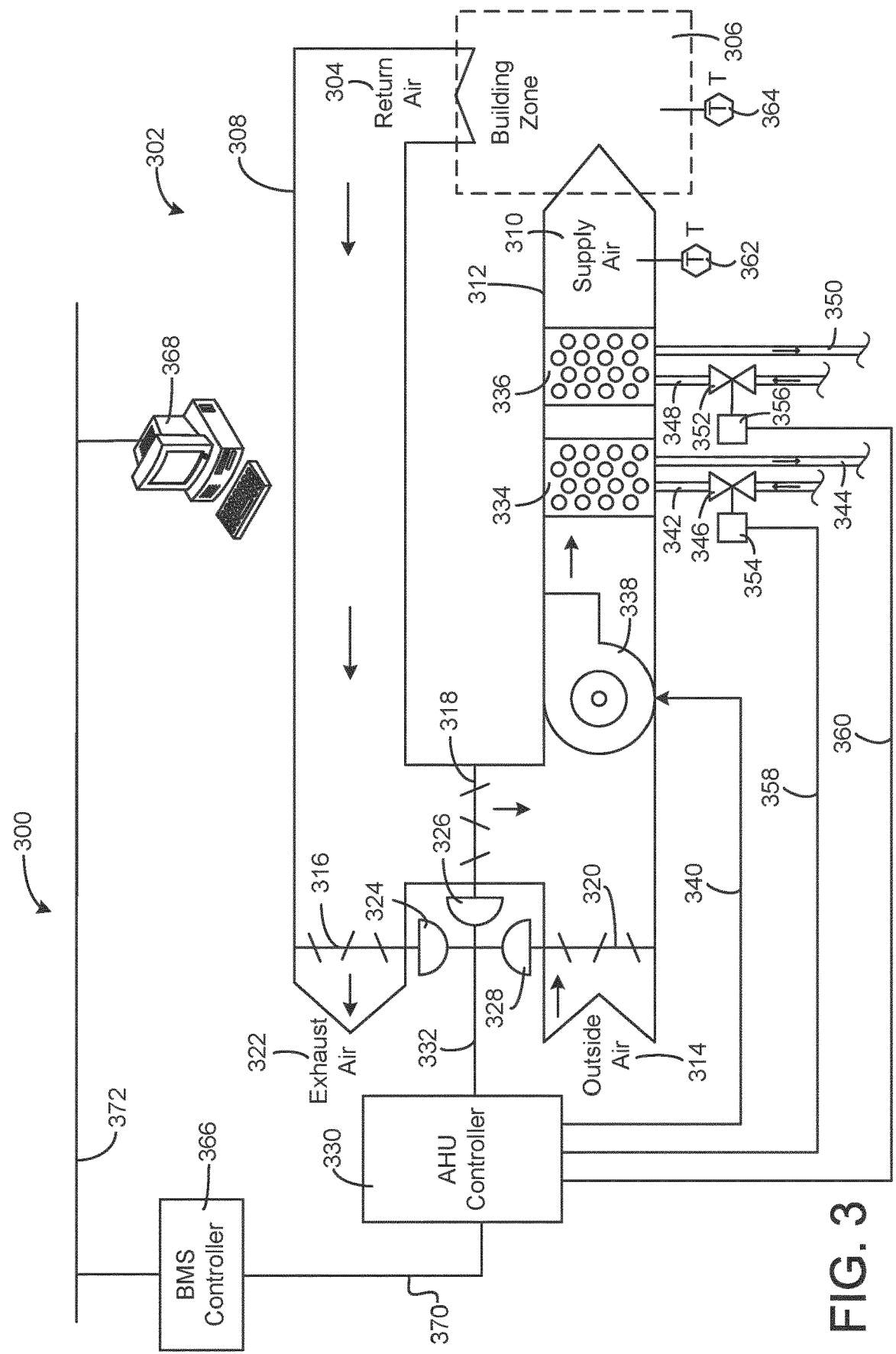
FIG. 3 is a block diagram of an airside system which can be implemented in the building of FIG. 1, according to some embodiments.

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by central plant 200.

Airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from central plant 200 (e.g., from cold water loop 216) via piping 342 and may return the chilled fluid to central plant 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from central plant 200 (e.g., from hot water loop 214) via piping 348 and may return the heated fluid to central plant 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, central plant 200, HVAC system 100, and/or other controllable systems that serve building 10. BMS controller 366 may communicate with multiple downstream building systems or subsystems (e.g., HVAC system 100, a security system, a lighting system, central plant 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Asset Allocation System

Figure 4:
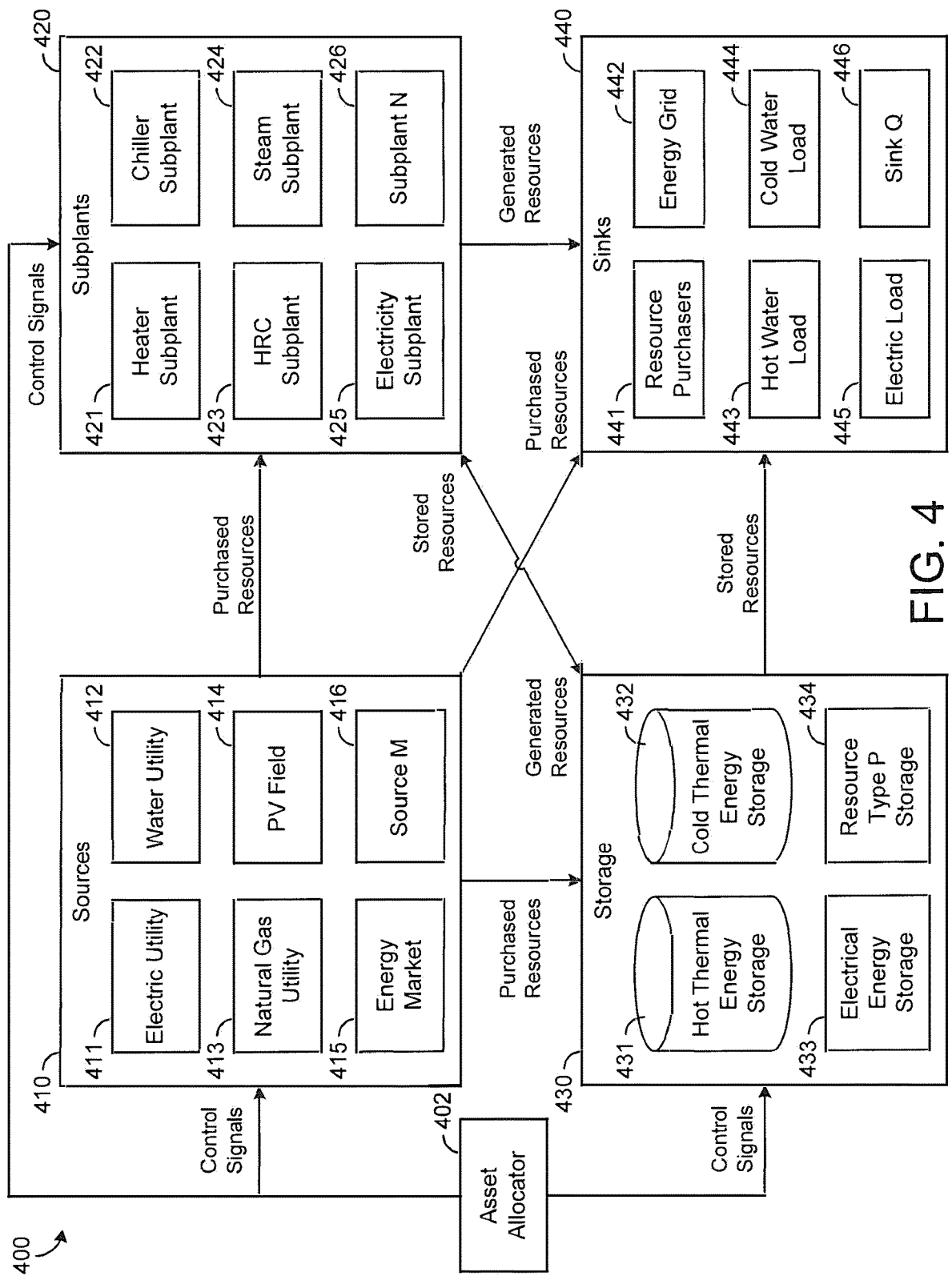
FIG. 4 is a block diagram of an asset allocation system including sources, subplants, storage, sinks, and an asset allocator configured to optimize the allocation of these assets, according to some embodiments.

Referring now to FIG. 4, a block diagram of an asset allocation system 400 is shown, according to an exemplary embodiment. Asset allocation system 400 can be configured to manage energy assets such as central plant equipment, battery storage, and other types of equipment configured to serve the energy loads of a building. Asset allocation system 400 can determine an optimal distribution of heating, cooling, electricity, and energy loads across different subplants (i.e., equipment groups) capable of producing that type of energy. In some embodiments, asset allocation system 400 is implemented as a component of central plant 200 and interacts with the equipment of central plant 200 in an online operational environment (e.g., performing real-time control of the central plant equipment). In other embodiments, asset allocation system 400 can be implemented as a component of a planning tool (described with reference to FIGS. 7) and can be configured to simulate the operation of a central plant over a predetermined time period for planning, budgeting, and/or design considerations.

Asset allocation system 400 is shown to include sources 410, subplants 420, storage 430, and sinks 440. These four categories of objects define the assets of a central plant and their interaction with the outside world. Sources 410 may include commodity markets or other suppliers from which resources such as electricity, water, natural gas, and other resources can be purchased or obtained. Sources 410 may provide resources that can be used by asset allocation system 400 to satisfy the demand of a building or campus. For example, sources 410 are shown to include an electric utility 411, a water utility 412, a natural gas utility 413, a photovoltaic (PV) field (e.g., a collection of solar panels), an energy market 415, and source M 416, where M is the total number of sources 410. Resources purchased from sources 410 can be used by subplants 420 to produce generated resources (e.g., hot water, cold water, electricity, steam, etc.), stored in storage 430 for later use, or provided directly to sinks 440.

Subplants 420 are the main assets of a central plant. Subplants 420 are shown to include a heater subplant 421, a chiller subplant 422, a heat recovery chiller subplant 423, a steam subplant 424, an electricity subplant 425, and subplant N, where N is the total number of subplants 420. In some embodiments, subplants 420 include some or all of the subplants of central plant 200, as described with reference to FIG. 2. For example, subplants 420 can include heater subplant 202, heat recovery chiller subplant 204, chiller subplant 206, and/or cooling tower subplant 208.

Subplants 420 can be configured to convert resource types, making it possible to balance requested loads from the building or campus using resources purchased from sources 410. For example, heater subplant 421 may be configured to generate hot thermal energy (e.g., hot water) by heating water using electricity or natural gas. Chiller subplant 422 may be configured to generate cold thermal energy (e.g., cold water) by chilling water using electricity. Heat recovery chiller subplant 423 may be configured to generate hot thermal energy and cold thermal energy by removing heat from one water supply and adding the heat to another water supply. Steam subplant 424 may be configured to generate steam by boiling water using electricity or natural gas. Electricity subplant 425 may be configured to generate electricity using mechanical generators (e.g., a steam turbine, a gas-powered generator, etc.) or other types of electricity-generating equipment (e.g., photovoltaic equipment, hydroelectric equipment, etc.).

The input resources used by subplants 420 may be provided by sources 410, retrieved from storage 430, and/or generated by other subplants 420. For example, steam subplant 424 may produce steam as an output resource. Electricity subplant 425 may include a steam turbine that uses the steam generated by steam subplant 424 as an input resource to generate electricity. The output resources produced by subplants 420 may be stored in storage 430, provided to sinks 440, and/or used by other subplants 420. For example, the electricity generated by electricity subplant 425 may be stored in electrical energy storage 433, used by chiller subplant 422 to generate cold thermal energy, used to satisfy the electric load 445 of a building, or sold to resource purchasers 441.

Storage 430 can be configured to store energy or other types of resources for later use. Each type of storage within storage 430 may be configured to store a different type of resource. For example, storage 430 is shown to include hot thermal energy storage 431 (e.g., one or more hot water storage tanks), cold thermal energy storage 432 (e.g., one or more cold thermal energy storage tanks), electrical energy storage 433 (e.g., one or more batteries), and resource type P storage 434, where P is the total number of storage 430. In some embodiments, storage 430 include some or all of the storage of central plant 200, as described with reference to FIG. 2. In some embodiments, storage 430 includes the heat capacity of the building served by the central plant. The resources stored in storage 430 may be purchased directly from sources or generated by subplants 420.

In some embodiments, storage 430 is used by asset allocation system 400 to take advantage of price-based demand response (PBDR) programs. PBDR programs encourage consumers to reduce consumption when generation, transmission, and distribution costs are high. PBDR programs are typically implemented (e.g., by sources 410) in the form of energy prices that vary as a function of time. For example, some utilities may increase the price per unit of electricity during peak usage hours to encourage customers to reduce electricity consumption during peak times. Some utilities also charge consumers a separate demand charge based on the maximum rate of electricity consumption at any time during a predetermined demand charge period.

Advantageously, storing energy and other types of resources in storage 430 allows for the resources to be purchased at times when the resources are relatively less expensive (e.g., during non-peak electricity hours) and stored for use at times when the resources are relatively more expensive (e.g., during peak electricity hours). Storing resources in storage 430 also allows the resource demand of the building or campus to be shifted in time. For example, resources can be purchased from sources 410 at times when the demand for heating or cooling is low and immediately converted into hot or cold thermal energy by subplants 420. The thermal energy can be stored in storage 430 and retrieved at times when the demand for heating or cooling is high. This allows asset allocation system 400 to smooth the resource demand of the building or campus and reduces the maximum required capacity of subplants 420. Smoothing the demand also asset allocation system 400 to reduce the peak electricity consumption, which results in a lower demand charge.

In some embodiments, storage 430 is used by asset allocation system 400 to take advantage of incentive-based demand response (IBDR) programs. IBDR programs provide incentives to customers who have the capability to store energy, generate energy, or curtail energy usage upon request. Incentives are typically provided in the form of monetary revenue paid by sources 410 or by an independent service operator (ISO). IBDR programs supplement traditional utility-owned generation, transmission, and distribution assets with additional options for modifying demand load curves. For example, stored energy can be sold to resource purchasers 441 or an energy grid 442 to supplement the energy generated by sources 410. In some instances, incentives for participating in an IBDR program vary based on how quickly a system can respond to a request to change power output/consumption. Faster responses may be compensated at a higher level. Advantageously, electrical energy storage 433 allows system 400 to quickly respond to a request for electric power by rapidly discharging stored electrical energy to energy grid 442.

Sinks 440 may include the requested loads of a building or campus as well as other types of resource consumers. For example, sinks 440 are shown to include resource purchasers 441, an energy grid 442, a hot water load 443, a cold water load 444, an electric load 445, and sink Q, where Q is the total number of sinks 440. A building may consume various resources including, for example, hot thermal energy (e.g., hot water), cold thermal energy (e.g., cold water), and/or electrical energy. In some embodiments, the resources are consumed by equipment or subsystems within the building (e.g., HVAC equipment, lighting, computers and other electronics, etc.). The consumption of each sink 440 over the optimization period can be supplied as an input to asset allocation system 400 or predicted by asset allocation system 400. Sinks 440 can receive resources directly from sources 410, from subplants 420, and/or from storage 430.

Still referring to FIG. 4, asset allocation system 400 is shown to include an asset allocator 402. Asset allocator 402 may be configured to control the distribution, production, storage, and usage of resources in asset allocation system 400. In some embodiments, asset allocator 402 performs an optimization process determine an optimal set of control decisions for each time step within an optimization period. The control decisions may include, for example, an optimal amount of each resource to purchase from sources 410, an optimal amount of each resource to produce or convert using subplants 420, an optimal amount of each resource to store or remove from storage 430, an optimal amount of each resource to sell to resources purchasers 441 or energy grid 440, and/or an optimal amount of each resource to provide to other sinks 440. In some embodiments, the control decisions include an optimal amount of each input resource and output resource for each of subplants 420.

In some embodiments, asset allocator 402 is configured to optimally dispatch all campus energy assets in order to meet the requested heating, cooling, and electrical loads of the campus for each time step within an optimization horizon or optimization period of duration h. Instead of focusing on only the typical HVAC energy loads, the concept is extended to the concept of resource. Throughout this disclosure, the term "resource" is used to describe any type of commodity purchased from sources 410, used or produced by subplants 420, stored or discharged by storage 430, or consumed by sinks 440. For example, water may be considered a resource that is consumed by chillers, heaters, or cooling towers during operation. This general concept of a resource can be extended to chemical processing plants where one of the resources is the product that is being produced by the chemical processing plat.

Asset allocator 402 can be configured to operate the equipment of asset allocation system 400 to ensure that a resource balance is maintained at each time step of the optimization period. This resource balance is shown in the following equation:

$$\Sigma x_{time} = 0 \; \forall \; \text{resources}, \forall \text{time} \in \text{horizon}$$

where the sum is taken over all producers and consumers of a given resource (i.e., all of sources 410, subplants 420, storage 430, and sinks 440) and time is the time index. Each time element represents a period of time during which the resource productions, requests, purchases, etc. are assumed constant. Asset allocator 402 may ensure that this equation is satisfied for all resources regardless of whether that resource is required by the building or campus. For example, some of the resources produced by subplants 420 may be intermediate resources that function only as inputs to other subplants 420.

In some embodiments, the resources balanced by asset allocator 402 include multiple resources of the same type (e.g., multiple chilled water resources, multiple electricity resources, etc.). Defining multiple resources of the same type may allow asset allocator 402 to satisfy the resource balance given the physical constraints and connections of the central plant equipment. For example, suppose a central plant has multiple chillers and multiple cold water storage tanks, with each chiller physically connected to a different cold water storage tank (i.e., chiller A is connected to cold water storage tank A, chiller B is connected to cold water storage tank B, etc.). Given that only one chiller can supply cold water to each cold water storage tank, a different cold water resource can be defined for the output of each chiller. This allows asset allocator 402 to ensure that the resource balance is satisfied for each cold water resource without attempting to allocate resources in a way that is physically impossible (e.g., storing the output of chiller A in cold water storage tank B, etc.).

Asset allocator 402 may be configured to minimize the economic cost (or maximize the economic value) of operating asset allocation system 400 over the duration of the optimization period. The economic cost may be defined by a cost function $J(x)$ that expresses economic cost as a function of the control decisions made by asset allocator 402. The cost function $J(x)$ may account for the cost of resources purchased from sources 410, as well as the revenue generated by selling resources to resource purchasers 441 or energy grid 442 or participating in incentive programs. The cost optimization performed by asset allocator 402 can be expressed as:

$$\underset{x}{\mathrm{argmin}} J(x)$$

where $J(x)$ is defined as follows:

$$J(x) = \sum_{sources} \sum_{horizon} \mathrm{cost}(purchase_{resource,time}, \mathrm{time}) - \sum_{incentives} \sum_{horizon} \mathrm{revenue}(ReservationAmount)$$

The first term in the cost function $J(x)$ represents the total cost of all resources purchased over the optimization horizon. Resources can include, for example, water, electricity, natural gas, or other types of resources purchased from a utility or other source 410. The second term in the cost function $J(x)$ represents the total revenue generated by participating in incentive programs (e.g., IBDR programs) over the optimization horizon. The revenue may be based on the amount of power reserved for participating in the incentive programs. Accordingly, the total cost function represents the total cost of resources purchased minus any revenue generated from participating in incentive programs.

Each of subplants 420 and storage 430 may include equipment that can be controlled by asset allocator 402 to optimize the performance of asset allocation system 400. Subplant equipment may include, for example, heating devices, chillers, heat recovery heat exchangers, cooling towers, energy storage devices, pumps, valves, and/or other devices of subplants 420 and storage 430. Individual devices of subplants 420 can be turned on or off to adjust the resource production of each subplant 420. In some embodiments, individual devices of subplants 420 can be operated at variable capacities (e.g., operating a chiller at 10% capacity or 60% capacity) according to an operating setpoint received from asset allocator 402. Asset allocator 402 can control the equipment of subplants 420 and storage 430 to adjust the amount of each resource purchased, consumed, and/or produced by system 400.

In some embodiments, asset allocator 402 minimizes the cost function while participating in PBDR programs, IBDR programs, or simultaneously in both PBDR and IBDR programs. For the IBDR programs, asset allocator 402 may use statistical estimates of past clearing prices, mileage ratios, and event probabilities to determine the revenue generation potential of selling stored energy to resource purchasers 441 or energy grid 442. For the PBDR programs, asset allocator 402 may use predictions of ambient conditions, facility thermal loads, and thermodynamic models of installed equipment to estimate the resource consumption of subplants 420. Asset allocator 402 may use predictions of the resource consumption to monetize the costs of running the equipment.

Asset allocator 402 may automatically determine (e.g., without human intervention) a combination of PBDR and/or IBDR programs in which to participate over the optimization horizon in order to maximize economic value. For example, asset allocator 402 may consider the revenue generation potential of IBDR programs, the cost reduction potential of PBDR programs, and the equipment maintenance/replacement costs that would result from participating in various combinations of the IBDR programs and PBDR programs. Asset allocator 402 may weigh the benefits of participation against the costs of participation to determine an optimal combination of programs in which to participate. Advantageously, this allows asset allocator 402 to determine an optimal set of control decisions that maximize the overall value of operating asset allocation system 400.

In some embodiments, asset allocator 402 optimizes the cost function J(x) subject to the following constraint, which guarantees the balance between resources purchased, produced, discharged, consumed, and requested over the optimization horizon:

$$\sum_{sources} purchase_{resource,time} +$$

$$\sum_{subplants} produces(x_{internal,time}, x_{external,time}, v_{uncontrolled,time}) -$$

$$\sum_{subplants} consumes(x_{internal,time}, x_{external,time}, v_{uncontrolled,time}) +$$

$$\sum_{storages} discharges_{resource}(x_{internal,time}, x_{external,time}) - \sum_{sinks} requests_{resource} =$$

$$0 \; \forall \text{ resources}, \forall \text{ time} \in \text{horizon}$$

where x_(internal,time) includes internal decision variables (e.g., load allocated to each component of asset allocation system 400), x_(external,time) includes external decision variables (e.g., condenser water return temperature or other shared variables across subplants 420), and v_(uncontrolled, time) includes uncontrolled variables (e.g., weather conditions).

The first term in the previous equation represents the total amount of each resource (e.g., electricity, water, natural gas, etc.) purchased from each source 410 over the optimization horizon. The second and third terms represent the total production and consumption of each resource by subplants 420 over the optimization horizon. The fourth term represents the total amount of each resource discharged from storage 430 over the optimization horizon. Positive values indicate that the resource is discharged from storage 430, whereas negative values indicate that the resource is charged or stored. The fifth term represents the total amount of each resource requested by sinks 440 over the optimization horizon. Accordingly, this constraint ensures that the total amount of each resource purchased, produced, or discharged from storage 430 is equal to the amount of each resource consumed, stored, or provided to sinks 440.

In some embodiments, additional constraints exist on the regions in which subplants 420 can operate. Examples of such additional constraints include the acceptable space (i.e., the feasible region) for the decision variables given the uncontrolled conditions, the maximum amount of a resource that can be purchased from a given source 410, and any number of plant-specific constraints that result from the mechanical design of the plant.

Asset allocator 402 may include a variety of features that enable the application of asset allocator 402 to nearly any central plant, central energy facility, combined heating and cooling facility, or combined heat and power facility. These features include broadly applicable definitions for subplants 420, sinks 440, storage 430, and sources 410; multiples of the same type of subplant 420 or sink 440; subplant resource connections that describe which subplants 420 can send resources to which sinks 440 and at what efficiency; subplant minimum turndown into the asset allocation optimization; treating electrical energy as any other resource that must be balanced; constraints that can be commissioned during runtime; different levels of accuracy at different points in the horizon; setpoints (or other decisions) that are shared between multiple subplants included in the decision vector; disjoint subplant operation regions; incentive based electrical energy programs; and high level airside models. Incorporation of these features may allow asset allocator 402 to support a majority of the central energy facilities that will be seen in the future. Additionally, it will be possible to rapidly adapt to the inclusion of new subplant types. Some of these features are described in greater detail below.

Broadly applicable definitions for subplants 420, sinks 440, storage 430, and sources 410 allow each of these components to be described by the mapping from decision variables to resources consume and resources produced. Resources and other components of system 400 do not need to be "typed," but rather can be defined generally. The mapping from decision variables to resource consumption and production can change based on extrinsic conditions. Asset allocator 402 can solve the optimization problem by simply balancing resource use and can be configured to solve in terms of consumed resource 1, consumed resource 2, produced resource 1, etc., rather than electricity consumed, water consumed, and chilled water produced. Such an interface at the high level allows for the mappings to be injected into asset allocation system 400 rather than needing them hard coded. Of course, "typed" resources and other components of system 400 can still exist in order to generate the mapping at run time, based on equipment out of service.

Incorporating multiple subplants 420 or sinks 440 of the same type allows for modeling the interconnections between subplants 420, sources 410, storage 430, and sinks 440. This type of modeling describes which subplants 420 can use resource from which sources 410 and which subplants 420 can send resources to which sinks 440. This can be visualized as a resource connection matrix (i.e., a directed graph) between the subplants 420, sources 410, sinks 440, and storage 430. Examples of such directed graphs are described in greater detail with reference to FIGS. 5A-5B. Extending this concept, it is possible to include costs for delivering the resource along a connection and also, efficiencies of the transmission (e.g., amount of energy that makes it to the other side of the connection).

In some instances, constraints arise due to mechanical problems after an energy facility has been built. Accordingly, these constraints are site specific and are often not incorporated into the main code for any of subplants 420 or the high level problem itself. Commissioned constraints allow for such constraints to be added without software updates during the commissioning phase of the project. Furthermore, if these additional constraints are known prior to the plant build, they can be added to the design tool run. This would allow the user to determine the cost of making certain design decisions.

Incorporating minimum turndown and allowing disjoint operating regions may greatly enhance the accuracy of the asset allocation problem solution as well as decrease the number of modifications to solution of the asset allocation by the low level optimization or another post-processing technique. It may be beneficial to allow for certain features to change as a function of time into the horizon. One could use the full disjoint range (most accurate) for the first four hours, then switch to only incorporating the minimum turndown for the next two days, and finally using to the linear relaxation with no binary constraints for the rest of the horizon. For example, asset allocator 402 can be given the operational domain that correctly allocates three chillers with a range of 1800 to 2500 tons. The true subplant range is then the union of [1800, 2500], [3600, 5000], and [5400, 7500]. If the range were approximated as [1800, 7500] the low level optimization or other post-processing technique would have to rebalance any solution between 2500 and 3600 or between 5000 and 5400 tons. Rebalancing is typically done heuristically and is unlikely to be optimal. Incorporating these disjoint operational domains adds binary variables to the optimization problem.

Some decisions made by asset allocator 402 may be shared by multiple elements of system 400. The condenser water setpoint of cooling towers is an example. It is possible to assume that this variable is fixed and allow the low level optimization to decide on its value. However, this does not allow one to make a trade-off between the chiller's electrical use and the tower's electrical use, nor does it allow the optimization to exceed the chiller's design load by feeding it cooler condenser water. Incorporating these extrinsic decisions into asset allocator 402 allows for a more accurate solution at the cost of computational time.

Incentive programs often require the reservation of one or more assets for a period of time. In traditional systems, these assets are typically turned over to alternative control, different than the typical resource price based optimization. Advantageously, asset allocator 402 can be configured to add revenue to the cost function per amount of resource reserved. Asset allocator 402 can then make the reserved portion of the resource unavailable for typical price based cost optimization. For example, asset allocator 402 can reserve a portion of a battery asset for frequency response. In this case, the battery can be used to move the load or shave the peak demand, but can also be reserved to participate in the frequency response program.

Plant Resource Diagrams

Figure 5A:
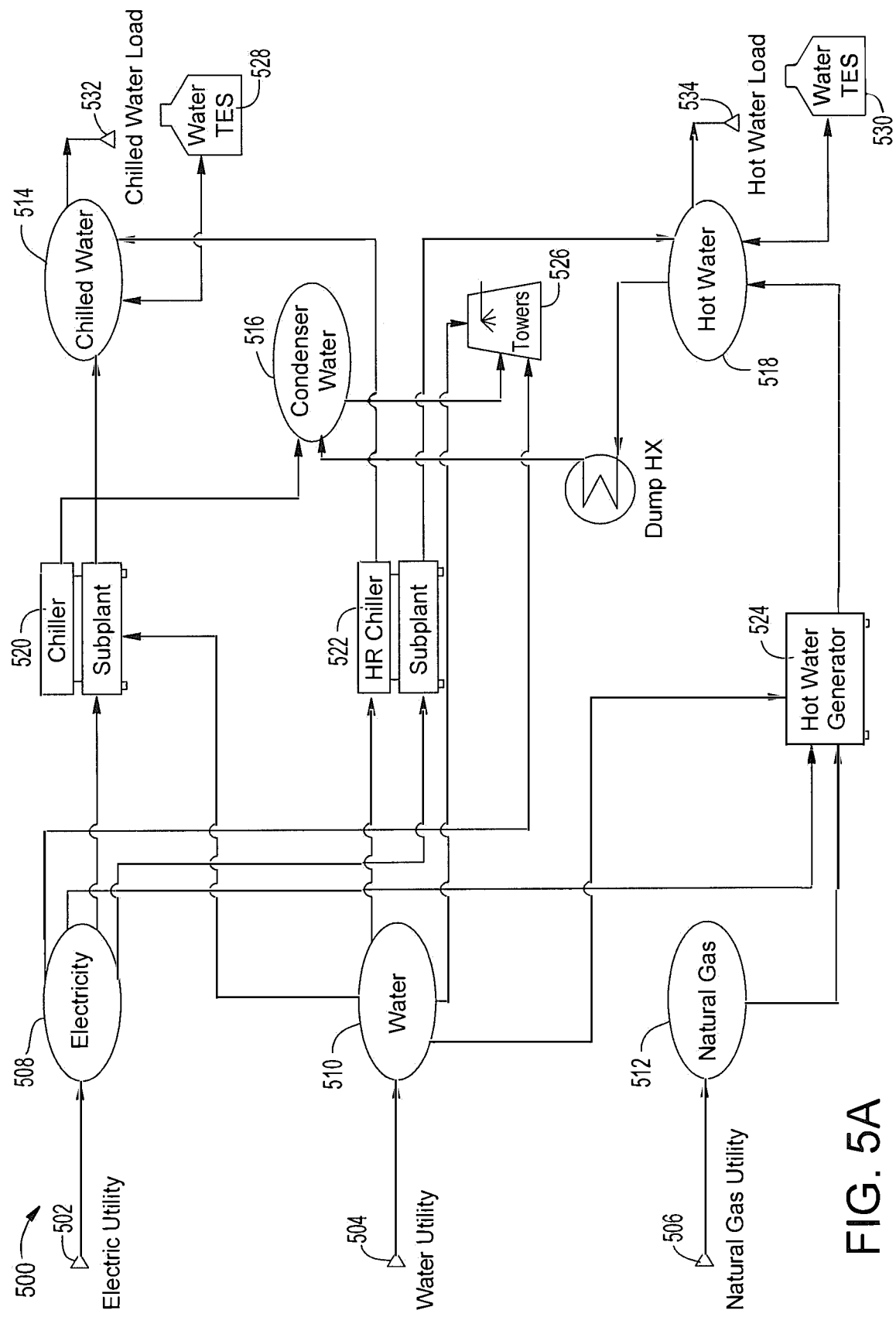
FIG. 5A is a plant resource diagram illustrating the elements of a central plant and the connections between such elements, according to some embodiments.

Referring now to FIG. 5A, a plant resource diagram 500 is shown, according to an exemplary embodiment. Plant resource diagram 500 represents a particular implementation of a central plant and indicates how the equipment of the central plant are connected to each other and to external systems or devices. Asset allocator 402 can use plant resource diagram 500 to identify the interconnections between various sources 410, subplants 420, storage 430, and sinks 440 in the central plant. In some instances, the interconnections defined by diagram 500 are not capable of being inferred based on the type of resource produced. For this reason, plant resource diagram 500 may provide asset allocator 402 with new information that can be used to establish constraints on the asset allocation problem.

Plant resource diagram 500 is shown to include an electric utility 502, a water utility 504, and a natural gas utility 506. Utilities 502-506 are examples of sources 410 that provide resources to the central plant. For example, electric utility 502 may provide an electricity resource 508, water utility 504 may provide a water resource 510, and natural gas utility 506 may provide a natural gas resource 512. The lines connecting utilities 502-506 to resources 508-512 along with the directions of the lines (i.e., pointing toward resources 508-512) indicate that resources purchased from utilities 502-506 add to resources 508-512.

Plant resource diagram 500 is shown to include a chiller subplant 520, a heat recovery (HR) chiller subplant 522, a hot water generator subplant 524, and a cooling tower subplant 526. Subplants 520-526 are examples of subplants 420 that convert resource types (i.e., convert input resources to output resources). For example, the lines connecting electricity resource 508 and water resource 510 to chiller subplant 520 indicate that chiller subplant 520 receives electricity resource 508 and water resource 510 as input resources. The lines connecting chiller subplant 520 to chilled water resource 514 and condenser water resource 516 indicate that chiller subplant 520 produces chilled water resource 514 and condenser water resource 516. Similarly, the lines connecting electricity resource 508 and water resource 510 to HR chiller subplant 522 indicate that HR chiller subplant 522 receives electricity resource 508 and water resource 510 as input resources. The lines connecting HR chiller subplant 522 to chilled water resource 514 and hot water resource 518 indicate that HR chiller subplant 522 produces chilled water resource 514 and hot water resource 518.

Plant resource diagram 500 is shown to include water TES 528 and 530. Water TES 528-530 are examples of storage 530 that can be used to store and discharge resources. The line connecting chilled water resource 514 to water TES 528 indicates that water TES 528 stores and discharges chilled water resource 514. Similarly, the line connecting hot water resource 518 to water TES 530 indicates that water TES 530 stores and discharges hot water resource 518. In diagram 500, water TES 528 is connected to only chilled water resource 514 and not to any of the other water resources 516 or 518. This indicates that water TES 528 can be used by asset allocator 402 to store and discharge only chilled water resource 514 and not the other water resources 516 or 518. Similarly, water TES 530 is connected to only hot water resource 518 and not to any of the other water resources 514 or 516. This indicates that water TES 530 can be used by asset allocator 402 to store and discharge only hot water resource 518 and not the other water resources 514 or 516.

Plant resource diagram 500 is shown to include a chilled water load 532 and a hot water load 534. Loads 532-534 are examples of sinks 440 that consume resources. The line connecting chilled water load 532 to chilled water resource 514 indicates that chilled water resource 514 can be used to satisfy chilled water load 532. Similarly, the line connecting hot water load 534 to hot water resource 518 indicates that hot water resource 518 can be used to satisfy hot water load 534. Asset allocator 402 can use the interconnections and limitations defined by plant resource diagram 500 to establish appropriate constraints on the optimization problem.

Figure 5B:
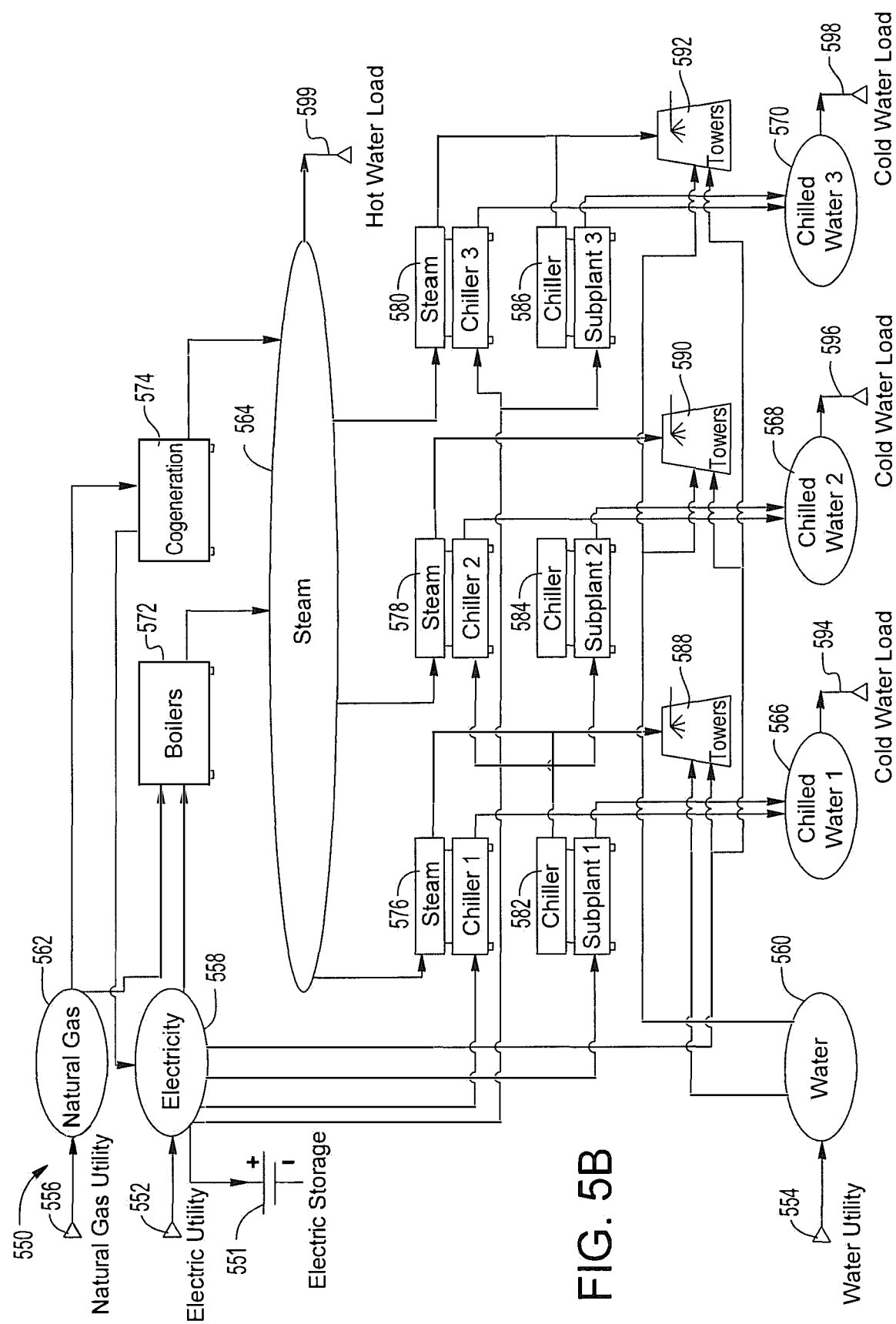
FIG. 5B is another plant resource diagram illustrating the elements of a central plant and the connections between such elements, according to some embodiments.

Referring now to FIG. 5B, another plant resource diagram 550 is shown, according to an exemplary embodiment. Plant resource diagram 550 represents another implementation of a central plant and indicates how the equipment of the central plant are connected to each other and to external systems or devices. Asset allocator 402 can use plant resource diagram 550 to identify the interconnections between various sources 410, subplants 420, storage 430, and sinks 440 in the central plant. In some instances, the interconnections defined by diagram 550 are not capable of being inferred based on the type of resource produced. For this reason, plant resource diagram 550 may provide asset allocator 402 with new information that can be used to establish constraints on the asset allocation problem.

Plant resource diagram 550 is shown to include an electric utility 552, a water utility 554, and a natural gas utility 556. Utilities 552-556 are examples of sources 410 that provide resources to the central plant. For example, electric utility 552 may provide an electricity resource 558, water utility 554 may provide a water resource 560, and natural gas utility 556 may provide a natural gas resource 562. The lines connecting utilities 552-556 to resources 558-562 along with the directions of the lines (i.e., pointing toward resources 558-562) indicate that resources purchased from utilities 552-556 add to resources 558-562. The line connecting electricity resource 558 to electrical storage 551 indicates that electrical storage 551 can store and discharge electricity resource 558.

Plant resource diagram 550 is shown to include a boiler subplant 572, a cogeneration subplant 574, several steam chiller subplants 576-580, several chiller subplants 582-586, and several cooling tower subplants 588-592. Subplants 572-592 are examples of subplants 420 that convert resource types (i.e., convert input resources to output resources). For example, the lines connecting boiler subplant 572 and cogeneration subplant 574 to natural gas resource 562, electricity resource 558, and steam resource 564 indicate that both boiler subplant 572 and cogeneration subplant 574 consume natural gas resource 562 and electricity resource 558 to produce steam resource 564.

The lines connecting steam resource 564 and electricity resource 558 to steam chiller subplants 576-580 indicate that each of steam chiller subplants 576-580 receives steam resource 564 and electricity resource 558 as input resources. However, each of steam chiller subplants 576-580 produces a different output resource. For example, steam chiller subplant 576 produces chilled water resource 566, steam chiller subplant 578 produces chilled water resource 568, and steam chiller subplant 580 produces chilled water resource 570. Similarly, the lines connecting electricity resource 558 to chiller subplants 582-586 indicate that each of chiller subplants 582-586 receives electricity resource 558 as an input. However, each of chiller subplants 582-586 produces a different output resource. For example, chiller subplant 582 produces chilled water resource 566, chiller subplant 584 produces chilled water resource 568, and chiller subplant 586 produces chilled water resource 570.

Chilled water resources 566-570 have the same general type (i.e., chilled water) but can be defined as separate resources by asset allocator 402. The lines connecting chilled water resources 566-570 to subplants 576-586 indicate which of subplants 576-586 can produce each chilled water resource 566-570. For example, plant resource diagram 550 indicates that chilled water resource 566 can only be produced by steam chiller subplant 576 and chiller subplant 582. Similarly, chilled water resource 568 can only be produced by steam chiller subplant 578 and chiller subplant 584, and chilled water resource 570 can only be produced by steam chiller subplant 580 and chiller subplant 586.

Plant resource diagram 550 is shown to include a hot water load 599 and several cold water loads 594-598. Loads 594-599 are examples of sinks 440 that consume resources. The line connecting hot water load 599 to steam resource 564 indicates that steam resource 564 can be used to satisfy hot water load 599. Similarly, the lines connecting chilled water resources 566-570 to cold water loads 594-598 indicate which of chilled water resources 566-570 can be used to satisfy each of cold water loads 594-598. For example, only chilled water resource 566 can be used to satisfy cold water load 594, only chilled water resource 568 can be used to satisfy cold water load 596, and only chilled water resource 570 can be used to satisfy cold water load 598. Asset allocator 402 can use the interconnections and limitations defined by plant resource diagram 550 to establish appropriate constraints on the optimization problem.

Planning Tool

Figure 6:
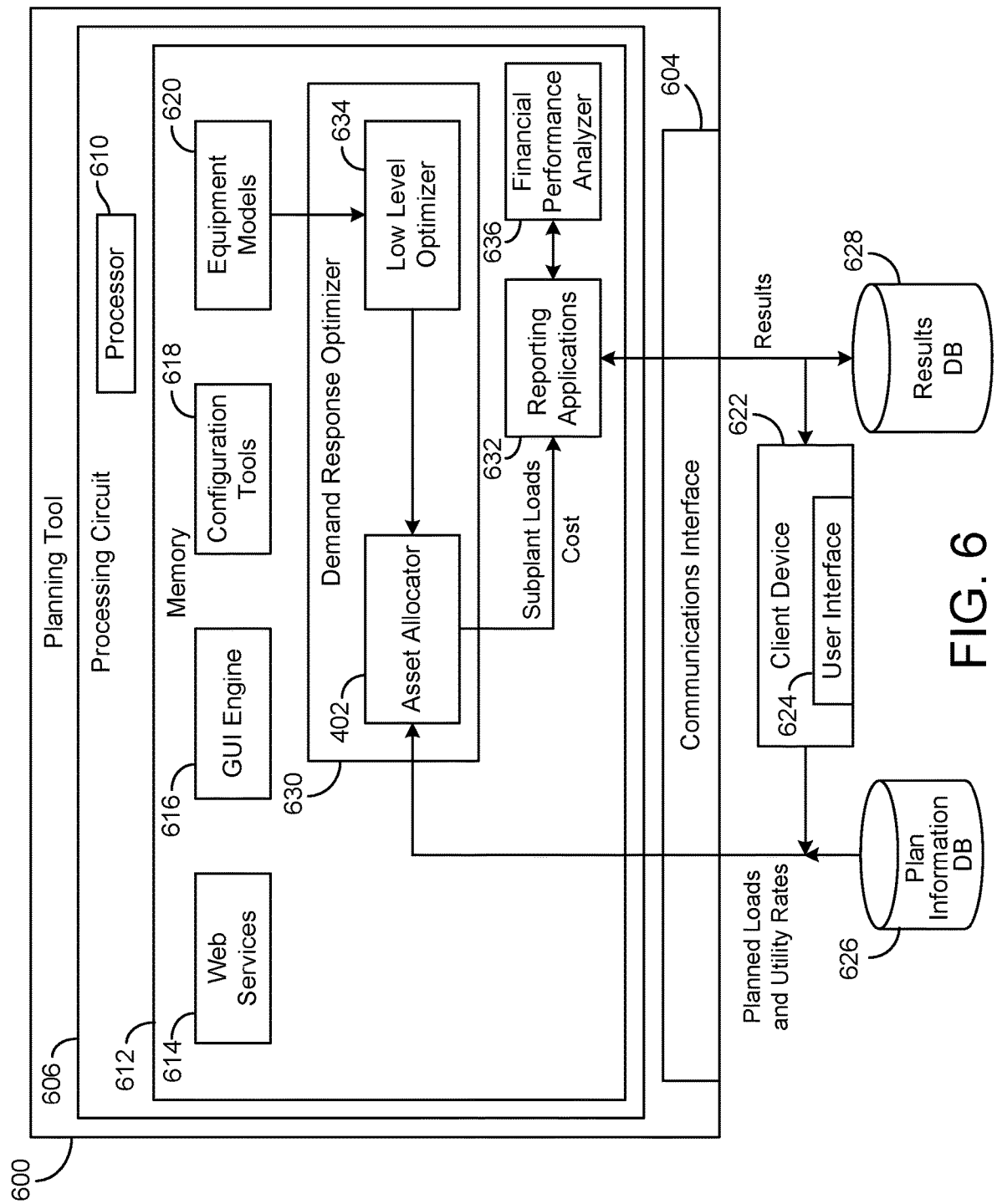
FIG. 6 is a block diagram of a planning tool in which the asset allocator of FIG. 4 can be implemented, according to some embodiments.

Referring now to FIG. 6, a block diagram of a planning tool 600 in which asset allocator 402 can be implemented is shown, according to an exemplary embodiment. Planning tool 600 may be configured to use demand response optimizer 630 to simulate the operation of a central plant over a predetermined time period (e.g., a day, a month, a week, a year, etc.) for planning, budgeting, and/or design considerations. For example, demand response optimizer 630 may use building loads and utility rates to determine an optimal resource allocation to minimize cost over a simulation period.

Planning tool 600 can be configured to determine the benefits of investing in a battery asset and the financial metrics associated with the investment. Such financial metrics can include, for example, the internal rate of return (IRR), net present value (NPV), and/or simple payback period (SPP). Planning tool 600 can also assist a user in determining the size of the battery which yields optimal financial metrics such as maximum NPV or a minimum SPP. In some embodiments, planning tool 600 allows a user to specify a battery size and automatically determines the benefits of the battery asset from participating in selected IBDR programs while performing PBDR. In some embodiments, planning tool 600 is configured to determine the battery size that minimizes SPP given the IBDR programs selected and the requirement of performing PBDR. In some embodiments, planning tool 600 is configured to determine the battery size that maximizes NPV given the IBDR programs selected and the requirement of performing PBDR.

In planning tool 600, asset allocator 402 may receive planned loads, utility rates, and weather forecasts for the entire simulation period. The planned loads, utility rates, and weather forecasts may be defined by input received from a user via a client device 622 (e.g., user-defined, user selected, etc.) and/or retrieved from a plan information database 626. Asset allocator 402 uses the planned loads, utility rates, and weather forecasts in conjunction with subplant curves from low level optimizer 634 to determine an optimal resource allocation (i.e., an optimal dispatch schedule) for a portion of the simulation period.

The portion of the simulation period over which asset allocator 402 optimizes the resource allocation may be defined by a prediction window ending at a time horizon. With each iteration of the optimization, the prediction window is shifted forward and the portion of the dispatch schedule no longer in the prediction window is accepted (e.g., stored or output as results of the simulation). Load and rate predictions may be predefined for the entire simulation and may not be subject to adjustments in each iteration. However, shifting the prediction window forward in time may introduce additional plan information (e.g., planned loads and/or utility rates) for the newly-added time slice at the end of the prediction window. The new plan information may not have a significant effect on the optimal dispatch schedule since only a small portion of the prediction window changes with each iteration.

In some embodiments, asset allocator 402 requests all of the subplant curves used in the simulation from low level optimizer 634 at the beginning of the simulation. Since the planned loads and environmental conditions are known for the entire simulation period, asset allocator 402 may retrieve all of the relevant subplant curves at the beginning of the simulation. In some embodiments, low level optimizer 634 generates functions that map subplant production to equipment level production and resource use when the subplant curves are provided to asset allocator 402. These subplant to equipment functions may be used to calculate the individual equipment production and resource use (e.g., in a post-processing module) based on the results of the simulation.

Still referring to FIG. 6, planning tool 600 is shown to include a communications interface 604 and a processing circuit 606. Communications interface 604 may include wired or wireless interfaces (e.g., jacks, antennas, transmitters, receivers, transceivers, wire terminals, etc.) for conducting data communications with various systems, devices, or networks. For example, communications interface 604 may include an Ethernet card and port for sending and receiving data via an Ethernet-based communications network and/or a WiFi transceiver for communicating via a wireless communications network. Communications interface 604 may be configured to communicate via local area networks or wide area networks (e.g., the Internet, a building WAN, etc.) and may use a variety of communications protocols (e.g., BACnet, IP, LON, etc.).

Communications interface 604 may be a network interface configured to facilitate electronic data communications between planning tool 600 and various external systems or devices (e.g., client device 622, results database 628, plan information database 626, etc.). For example, planning tool 600 may receive planned loads and utility rates from client device 622 and/or plan information database 626 via communications interface 604. Planning tool 600 may use communications interface 604 to output results of the simulation to client device 622 and/or to store the results in results database 628.

Still referring to FIG. 6, processing circuit 606 is shown to include a processor 610 and memory 612. Processor 610 may be a general purpose or specific purpose processor, an application specific integrated circuit (ASIC), one or more field programmable gate arrays (FPGAs), a group of processing components, or other suitable processing components. Processor 610 may be configured to execute computer code or instructions stored in memory 612 or received from other computer readable media (e.g., CDROM, network storage, a remote server, etc.).

Memory 612 may include one or more devices (e.g., memory units, memory devices, storage devices, etc.) for storing data and/or computer code for completing and/or facilitating the various processes described in the present disclosure. Memory 612 may include random access memory (RAM), read-only memory (ROM), hard drive storage, temporary storage, non-volatile memory, flash memory, optical memory, or any other suitable memory for storing software objects and/or computer instructions. Memory 612 may include database components, object code components, script components, or any other type of information structure for supporting the various activities and information structures described in the present disclosure. Memory 612 may be communicably connected to processor 610 via processing circuit 606 and may include computer code for executing (e.g., by processor 610) one or more processes described herein.

Still referring to FIG. 6, memory 612 is shown to include a graphical user interface GUI engine 616, web services 614, and configuration tools 618. In other embodiments, any one or more of the GUI engine 616, web services 614, and configuration tools 618 can be provided as separate components outside of central planning tool 600. In an example embodiment, GUI engine 616 includes a graphical user interface component configured to provide graphical user interfaces to a user for selecting or defining plan information for the simulation (e.g., planned loads, utility rates, environmental conditions, etc.). Graphical user interfaces can include graphical elements (e.g., widgets, dashboard controls, windows, etc.) for displaying financial performance data or other information to users of a GUI. The user interface or report (or underlying data engine) may be configured to aggregate and categorize operating conditions by building, building type, equipment type, and the like. Web services 614 may allow a user to interact with planning tool 600 via a web portal and/or from a remote system or device (e.g., an enterprise control application).

Configuration tools 618 can allow a user to define (e.g., via graphical user interfaces, via prompt-driven "wizards," etc.) various parameters of the simulation such as the number and type of subplants, the devices within each subplant, the subplant curves, device-specific efficiency curves, the duration of the simulation, the duration of the prediction window, the duration of each time step, and/or various other types of plan information related to the simulation. Configuration tools 618 can present user interfaces for building the simulation. The user interfaces may allow users to define simulation parameters graphically. In some embodiments, the user interfaces allow a user to select a pre-stored or pre-constructed simulated plant and/or plan information (e.g., from plan information database 626) and adapt it or enable it for use in the simulation.

Memory 612 can also include equipment models 620. Equipment models 620 can store pertinent model definitions and functions of plant or subplant devices. Such model definitions could include efficiency curves, load or consumption curves, principle costs, operating costs, operating cost curves, or any other relevant energy or cost modeling parameter. Equipment models 620 can provide such models to low level optimizer 634 for optimization of systems in demand response optimizer 630.

Still referring to FIG. 6, memory 612 is shown to include demand response optimizer 630. Demand response optimizer 630 may perform a cascaded optimization process to optimize the performance of asset allocation system 400. For example, demand response optimizer 630 is shown to include asset allocator 402 and a low level optimizer 634. Asset allocator 402 may control an outer (e.g., subplant level) loop of the cascaded optimization. Asset allocator 402 may determine an optimal set of control decisions for each time step in the prediction window in order to optimize (e.g., maximize) the value of operating asset allocation system 400. Control decisions made by asset allocator 402 may include, for example, load setpoints for each of subplants 420, charge/discharge rates for each of storage 430, resource purchase amounts for each type of resource purchased from sources 410, and/or an amount of each resource sold to energy purchasers 504. In other words, the control decisions may define resource allocation at each time step. The control decisions made by asset allocator 402 are based on the statistical estimates of incentive event probabilities and revenue generation potential for various IBDR events as well as the load and rate predictions.

Low level optimizer 634 may control an inner (e.g., equipment level) loop of the cascaded optimization. Low level optimizer 634 may determine how to best run each subplant at the load setpoint determined by asset allocator 402. For example, low level optimizer 634 may determine on/off states and/or operating setpoints for various devices of the subplant equipment in order to optimize (e.g., minimize) the energy consumption of each subplant while meeting the resource allocation setpoint for the subplant. In some embodiments, low level optimizer 634 receives actual incentive events from related incentive programs. Low level optimizer 634 may determine whether to participate in the incentive events based on the resource allocation set by asset allocator 402. For example, if insufficient resources have been allocated to a particular IBDR program by asset allocator 402 or if the allocated resources have already been used, low level optimizer 634 may determine that asset allocation system 400 will not participate in the IBDR program and may ignore the IBDR event. However, if the required resources have been allocated to the IBDR program and are available in storage 430, low level optimizer 634 may determine that system 400 will participate in the IBDR program in response to the IBDR event. The cascaded optimization process performed by demand response optimizer 630 is described in greater detail in U.S. patent application Ser. No. 15/247,885 filed Aug. 25, 2016.

In some embodiments, low level optimizer 634 generates and provides subplant curves to asset allocator 402. Each subplant curve may indicate an amount of resource consumption by a particular subplant (e.g., electricity use measured in kW, water use measured in L/s, etc.) as a function of the subplant load. In some embodiments, low level optimizer 634 generates the subplant curves by running the low level optimization process for various combinations of subplant loads and weather conditions to generate multiple data points. Low level optimizer 634 may fit a curve to the data points to generate the subplant curves. In other embodiments, low level optimizer 634 provides the data points asset allocator 402 and asset allocator 402 generates the subplant curves using the data points. Asset allocator 402 may store the subplant curves in memory for use in the high level (i.e., asset allocation) optimization process.

In some embodiments, the subplant curves are generated by combining efficiency curves for individual devices of a subplant. A device efficiency curve may indicate the amount of resource consumption by the device as a function of load. The device efficiency curves may be provided by a device manufacturer or generated using experimental data. In some embodiments, the device efficiency curves are based on an initial efficiency curve provided by a device manufacturer and updated using experimental data. The device efficiency curves may be stored in equipment models 620. For some devices, the device efficiency curves may indicate that resource consumption is a U-shaped function of load. Accordingly, when multiple device efficiency curves are combined into a subplant curve for the entire subplant, the resultant subplant curve may be a wavy curve. The waves are caused by a single device loading up before it is more efficient to turn on another device to satisfy the subplant load.

Demand response optimizer 630 may use the planned loads, utility rates, and weather forecasts to determine an optimal resource allocation over a prediction window. With each iteration of the optimization process, demand response optimizer 630 may shift the prediction window forward and apply the optimal resource allocation for the portion of the simulation period no longer in the prediction window. Demand response optimizer 630 may use the new plan information at the end of the prediction window to perform the next iteration of the optimization process. Demand response optimizer 630 may output the applied resource allocation to reporting applications 630 for presentation to a client device 622 (e.g., via user interface 624) or storage in results database 628.

Still referring to FIG. 6, memory 612 is shown to include reporting applications 632. Reporting applications 632 may receive the optimized resource allocations from demand response optimizer 630 and, in some embodiments, costs associated with the optimized resource allocations. Reporting applications 632 may include a web-based reporting application with several graphical user interface (GUI) elements (e.g., widgets, dashboard controls, windows, etc.) for displaying key performance indicators (KPI) or other information to users of a GUI. In addition, the GUI elements may summarize relative energy use and intensity across various plants, subplants, or the like. Other GUI elements or reports may be generated and shown based on available data that allow users to assess the results of the simulation. The user interface or report (or underlying data engine) may be configured to aggregate and categorize resource allocation and the costs associated therewith and provide the results to a user via a GUI. The GUI elements may include charts or histograms that allow the user to visually analyze the results of the simulation.

In some embodiments, some or all components of demand response optimizer 630 can be implemented as an integrated simulation engine service A3S (i.e., application as a service) external to planning tool 600. In such embodiments, demand response optimizer 630 receives simulation data (e.g., equipment models 620, weather forecasts, planned loads and utility rates, etc.) from planning tool 600 and applies an algorithm in order to generate simulation results. The simulation results may then be returned and planning tool 600 can perform further calculations (e.g., derive cost, determine best fit model) to be presented via user interface 624.

In some embodiments, planning tool 600 can also include financial performance analyzer 636. Financial performance analyzer 636 performs economic analysis of simulation results for investment appraisal. Financial performance analyzer 636 can be configured to receive input from client device 622 to initiate or alter economic analyses performed. In some embodiments, financial performance analyzer 636 may receive simulation results from demand response optimizer 630 to generate financial performance data. In other embodiments, financial performance analyzer 636 retrieves simulation results from results database 628. Financial performance analyzer 636 may communicate with reporting applications 632 to display financial performance data alongside other data presented by reporting applications 632. In another embodiment, financial performance analyzer 636 is integrated within reporting applications 632.

Financial performance analyzer 636 uses simulation data generated by demand response optimizer 630 and given analysis parameters to generate the financial performance data. Simulation data can include, but is not limited to, plant design identifiers, simulation conditions, energy usage data, and cost data. Cost data may include, but is not limited to, initial capital or costs, maintenance costs, operating costs, expected system lifespan, or any other cost associated with implementing a particular central plant design. In some embodiments, cost data may be aggregated or estimated for a period of time, such as the costs for a day, week, month, or year. In some embodiments, some cost data may be input by a user via user interface 624 and sent to financial performance analyzer 636. In other embodiments, cost data is retrieved from plan information database 626 or results database 628. Analysis parameters may include, but are not limited to, an evaluation period, discount rates, escalation rates, desired market rates, baseline costs, projected maintenance costs, or any other parameter that aids in performing financial performance analyses. In one embodiment, a user inputs desired analysis parameters via user interface 624. In another embodiment, financial performance analyzer 636 retrieves analysis parameters from plan information database 626 or results database 628. In some embodiments, financial performance analyzer 636 can be configured to receive new or different analysis parameters and dynamically update financial performance data calculations for display to a user.

Financial performance data generated by financial performance analyzer 636 can include economic feasibility metrics or predicted financial data. Economic feasibility metrics could include, but are not limited to, Net Present Values (NPV), Internal Rate of Return (IRR), simple or discounted payback period, modified IRR, accounting rate of return, average accounting return, average rate of return, profitability index, equivalent annual cost, real options valuation, or any other metric or technique used for investment appraisal. Predicted financial data could include, but is not limited to, future cash flows, aggregate cash flows, time-phased expenses, revenues, and/or savings, or any other predictive financial data. The calculation of several metrics are described herein for illustration; however, many financial performance metrics and predictive financial data can be generated according to several different methods, and it should be appreciated that the calculation of any financial performance data is not solely limited to the methods described or illustrated herein.

To generate time-phased cash flows (e.g., revenues, expenses, savings, etc.), the financial performance analyzer 636 uses a defined discount rate, escalation rate, or market rate to adjust the cash flow, for the time-value of money. Financial performance analyzer 636 may predict future cash flows by transforming current or present cash flows according to the equation:

$$F = P * (1 + r)^N$$

wherein F is the future predicted cash flow, P is the present value of the cash flow, r is the escalation rate or other market rate, and N is the number of time intervals between the present cash flow P and the future cash flow F for which the escalation rate or market rate represents. For example, if r is an escalation rate per year, N represents the number of years between the present and desired future cash flow. Similarly, to convert future cash flows into present or current cash flows, the financial performance analyzer 636 may use the equation:

$$P = \frac{F}{(1+r)^N}$$

wherein P is the present value of the cash flow, F is the future predicted cash flow, r is the discount rate or market rate, and N is the number of time intervals between the present cash flow P and the future cash flow F for which the discount rate or market rate represents. In other words, to convert a future expense F that is say N years from now into present-day dollars, financial performance analyzer 636 uses the above equation given a discount or market rate r.

A Net Present Value (NPV) is the current value of a project over an evaluation period in present-day dollars. To generate an NPV for a simulated plant design, financial performance analyzer 636 converts all future cash flows into present-day dollars, and subtract the initial expenses from the sum their present-day equivalences. For example, NPV can be calculated by the equation:

$$NPV = \sum_{i=0}^{N} \frac{F_i}{(1+r)^i}$$

wherein i denotes a time period in the evaluation period relative to present-day, N is the total number of time periods in the evaluation period, $F_i$ is the aggregate cash flow for time period i, and r is the discount or market rate for the given time interval. It should be appreciated that $F_i$ sums revenues or savings for time period i as positive and sums expenses or losses for time period i as negatives. $F_0$ should be recognized to represent present cash flows which include initial costs of a project.

The NPV value can be compared to a threshold to assess the economic feasibility of a plant design. For example, if the NPV threshold is zero, a positive NPV indicates that the projected earnings generated by a project (in present dollars) exceeds the anticipated costs. Hence, a positive NPV result affirms a decision of the selecting the plant design. Conversely, a negative NPV indicates that the projected earnings will not outweigh the anticipated costs in the evaluation period, and that the plant design is not economically feasible. Likewise, a non-zero threshold can be chosen and used to assess a plant design's profitability.

An Internal Rate of Return (IRR) is the necessary discount or market rate required to make the NPV of a project equal to zero. IRR can be calculated by adopting the NPV equation such that:

$$0 = \sum_{i=0}^{N} \frac{F_i}{(1+IRR)^i}$$

wherein i denotes a time period from present-day, N is the total number of time periods in an evaluation period, and $F_i$ is the aggregate cash flow for time period i. It should be appreciated that $F_i$ sums revenues or savings for time period i as positive and sums expenses or losses for time period i as negatives. $F_0$ should be recognized to represent present cash flows which include initial costs of a project.

Given that finding an exact solution to the IRR equation can be computationally or algebraically complex, several estimations of the IRR calculation can be used. In one embodiment, the IRR can be estimated using a look-up table. In another embodiment, the IRR can be estimated using an iterative approximation, such as the Newton-Raphson Approach.

In such an approach, the algorithm begins with an initial estimated IRR value, and for the initial IRR value, calculates both the NPV of the cash flows and the derivative of the NPV, which the derivative of the NPV can be found according to the equation:

$$D_x = \sum_{i=0}^{N} \frac{-i * F_i}{(1 + IRR_x)^{i+1}}$$

wherein $D_x$ is the derivative of the NPV for iteration x, $IRR_x$ is the estimated IRR value for iteration x, i denotes a time period from present-day, N is the total number of time periods, and $F_i$ is the aggregate cash flow for time period i.

A new estimated IRR value is calculated by the equation:

$$IRR_{x+1} = IRR_x - \frac{NPV_x}{D_x}$$

wherein $IRR_{x+1}$ is the new estimated IRR value, $IRR_x$ is the previous estimated IRR value, $NPV_x$ is the NPV value for iteration x, and $D_x$ is the derivative of the NPV for iteration x.

An error between IRR estimates can be calculated by the equation:

$$\text{Error} = \text{IRR}_{x+1} - \text{IRR}_x$$

wherein if the error is less than a predefined error threshold, the new IRR value is used as the final estimated IRR value. If the error is not less than the error threshold, the algorithm repeats with the new IRR value to generate yet another IRR value. The algorithm will repeat until an error is less than the error bound, or the algorithm reaches a predefined maximum number of iterations.

To assess a project based on its IRR, the IRR is compared to a required rate of return. The required rate of return could be a known or accepted market rate, or a user chosen rate. The required rate of return represents the minimum profitability of a project that a user is willing to accept to outweigh the risk and burden of implementing a new plant design. If the estimated IRR is greater than the required rate of return, the project can be accepted, and if IRR is less than the required rate of return, it can be rejected.

A Payback Period is the amount of time it will take to recover the investment costs of the plant design. A payback period can be a simple payback period or a discounted payback period. A simple payback period is calculated by the equation:

$$PP_s = \frac{C_0}{R_i}$$

wherein $PP_s$ is the simple payback period, $C_0$ is the initial or principle cost of the plant design, and $R_i$ is the expected savings or revenue per time period. For example, if a plant design costs $100,000 to install, and will save $25,000 per year, the simple payback period would then be 4.0 years.

The discounted payback period uses the time-phased discount of future earnings to calculate the payback period in today's dollars. To estimate the discounted payback period, the NPV must be calculated incrementally using a discount rate until the NPV becomes greater than or equal to 0. For example, the cash flow at time period zero may be negative due to initial costs. The NPV is then calculated for the evaluation period of 1 year, in which case, the NPV may still be negative. The NPV is then recalculated for an evaluation period of 2 years, then 3 years, and so on until the NPV becomes zero or positive. The number of years (for example, N) to make the NPV zero is the discounted payback period. In the event the NPV is greater than zero, the discounted payback period may be estimated by interpolating the total time based on the incremental time-phase cash flow introduced by the Nth year.

A payback period can be compared to a desired payback period to ensure the required costs of the plant design implementation are recovered in a reasonable time. A user may define the maximum time frame they are willing to accept for a payback period of a project. Such a maximum payback period may be chosen based on projected market trends or anticipated risk for asset loss. The anticipated lifespan of the plant design may also provide an upper bound on an acceptable payback period.

To provide more accurate financial performance data, financial performance analyzer 636 may calculated financial performance data using the individual simulated cost and saving data available in the simulation data. For example, demand response optimizer 630 may simulate a central plant design in one-hour, one-day, or one-month increments based on interest in anticipated fluctuations or variations of loads or utility rates over time. As such, rather than aggregating simulated costs into single metrics, such as a "cost per year", the financial performance analyzer 636 may time-phase adjust the individual data for each simulation increment to provide a more accurate time-phased adjustment of costs.

Any value, rate, or cost can be time-value adjusted by financial performance analyzer 636 to generate financial performance data. In some embodiments of the present disclosure, the financial performance analyzer 636 utilizes or generates cost data associated with different time intervals from the demand response optimizer 630 (e.g., some simulation data is analyzed on a per-year basis while other data is analyzed on a per-month basis). In other embodiments, the financial performance analyzer 636 may calculate the monthly time-phased savings and expenses rather than aggregated yearly savings and expenses. In some embodiments, the financial performance analyzer 636 may use different discount or escalation rates for different cash flows based on the type of cash flow (e.g., savings, operating costs, investment capital, maintenance costs, etc.).

Platform Flow Diagram

Figure 7:
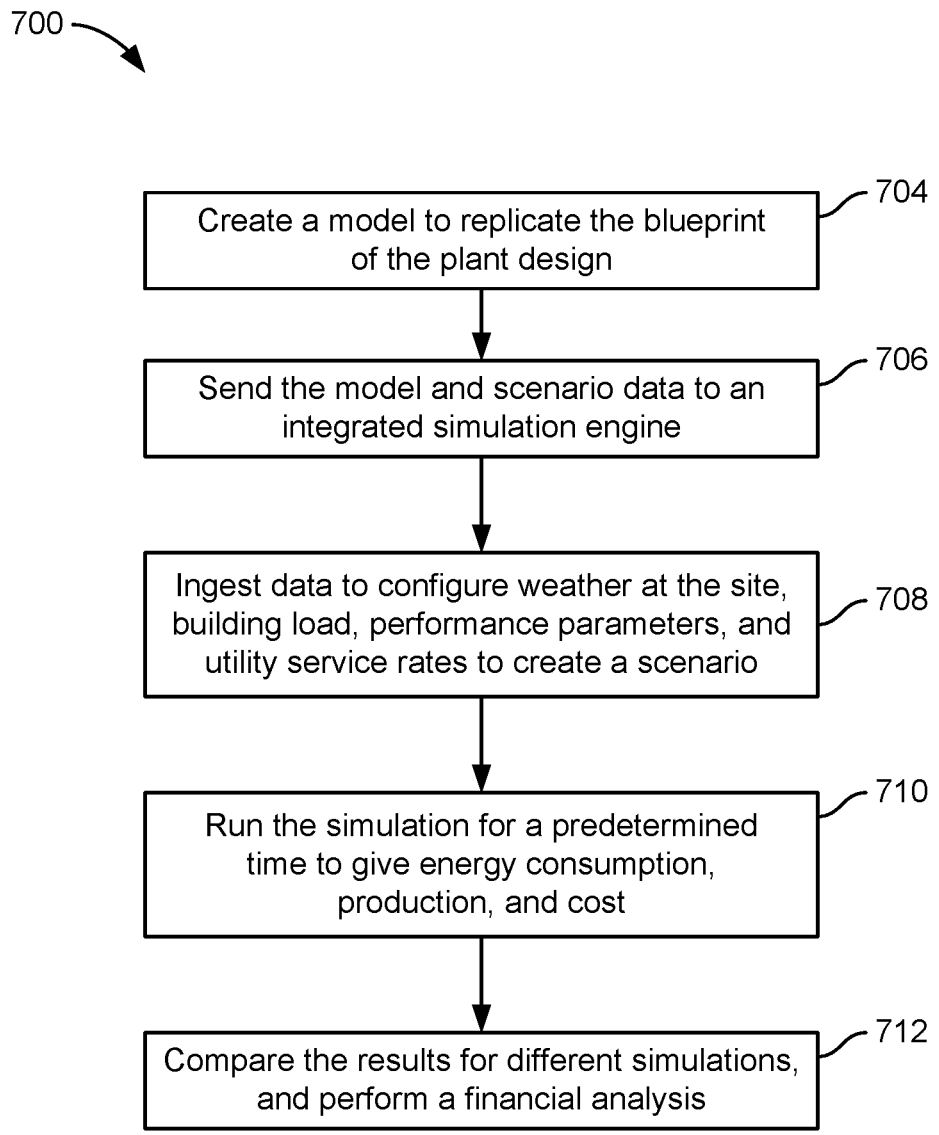
FIG. 7 is a flow diagram of a platform for comparing plant design models, according to some embodiments.

As depicted in the flow diagram 700 of FIG. 7, an economic feasibility platform, such as Planning Tool 600, can analyze and compare various plant designs through simulation data. The economic feasibility platform can model a specific plant design (step 704). Then, the model along with integrated scenario data are sent to an integrated Simulation Engine comprising one or more predictive algorithms (step 706). In some embodiments, the integrated Simulation Engine can be demand response optimizer 630. In other embodiments, the integrated Simulation Engine is hosted externally as an A3S (Application as a Service). The integrated Simulation Engine can configure a scenario under which to run simulation algorithms on the integrated data (step 708) and can generate simulation results over a user-defined simulation time (step 710). The simulation results can be presented to a user and undergo additional financial analysis (712). Financial analysis can include any of the financial performance data discussed in relation to the financial performance analyzer 636.

Generating the plant design model in step 704 can be performed by a user via configuration tools 618 and equipment models 620. For example, a model can be created and validated by a Planning Tool as described in the U.S. patent application Ser. No. 16/370,632 filed Mar. 29, 2019. In another embodiment, a plant design model is retrieved from plan information database 626.

Step 706 gathers pertinent scenario data to be used in the simulation. The scenario data provides information to the simulator to define what conditions and parameters under which the model should be optimized and simulated. Scenario data can include, but is not limited to, plant site environment data, expected or hourly load profiles, component efficiencies, and utility costs. In some embodiments, scenario data can be based on known or historical data for a given location or plant. In some embodiments, the scenario data is retrieved from internal memory or an external database such as plan information database 726. In another embodiment, the scenario is retrieved from external sources, such as a weather data service or utility provider server. The model and gathered data are sent to the Simulation Engine.

The simulation scenario is configured in step 708. In some embodiments, scenario data is defined or mapped for individual increments of time. For example, for every hour in a three month period of time, an outside temperature, load demand, and utility rate are defined for a central plant system or subsystem. In other embodiments, scenarios can be generalized into broad categories for simulation for simulated time intervals. For example, loads may be generalized as a high occupancy scenario or a low occupancy scenario. In another example, weather forecasts may be generalized as mild weather conditions or turbulent weather conditions. Such condition generalizations can be combined in periodic segments so as to replicate periodic trends (e.g., high occupancy in the day, low occupancy at night, or warm weather in the summer, cold weather in the winter). In some embodiments, the same plant design model may be optimized and simulated for multiple different scenarios. Such embodiments may be advantageous when the exact conditions of operation are unknown or otherwise difficult to predict. For example, a plant design may be optimized and simulated under various occupancy conditions to understand the profitability in different long-term load demands. In another example, a plant design may be simulated using two different utility providers.

Step 710 simulates the given plant design model under the scenario to generate simulation data. Simulation results can include, but is not limited to, first year total energy cost, other energy consumption data, initial system costs, yearly system operating costs, performance metrics, and load profiles for the data and specified simulation time line. In some embodiments, step 710 also includes optimization algorithms to identify optimal asset allocation or component capacities as described in relation to FIG. 4.

Simulation result data is displayed to a user of Planning Tool for further economic analysis in step 712. The derived Energy Cost can serve a basis of comparison between varied replicated client site models being compared in order to derive the best fit model. In some embodiments, a user indicates one or more simulation results to generate financial performance data. Generation of the economic analysis can be performed by financial performance analyzer 636. In other embodiments, financial performance data can be retrieved from results database 628 from previously analyzed plant designs or simulations.

Financial Performance Calculator

Figure 8:
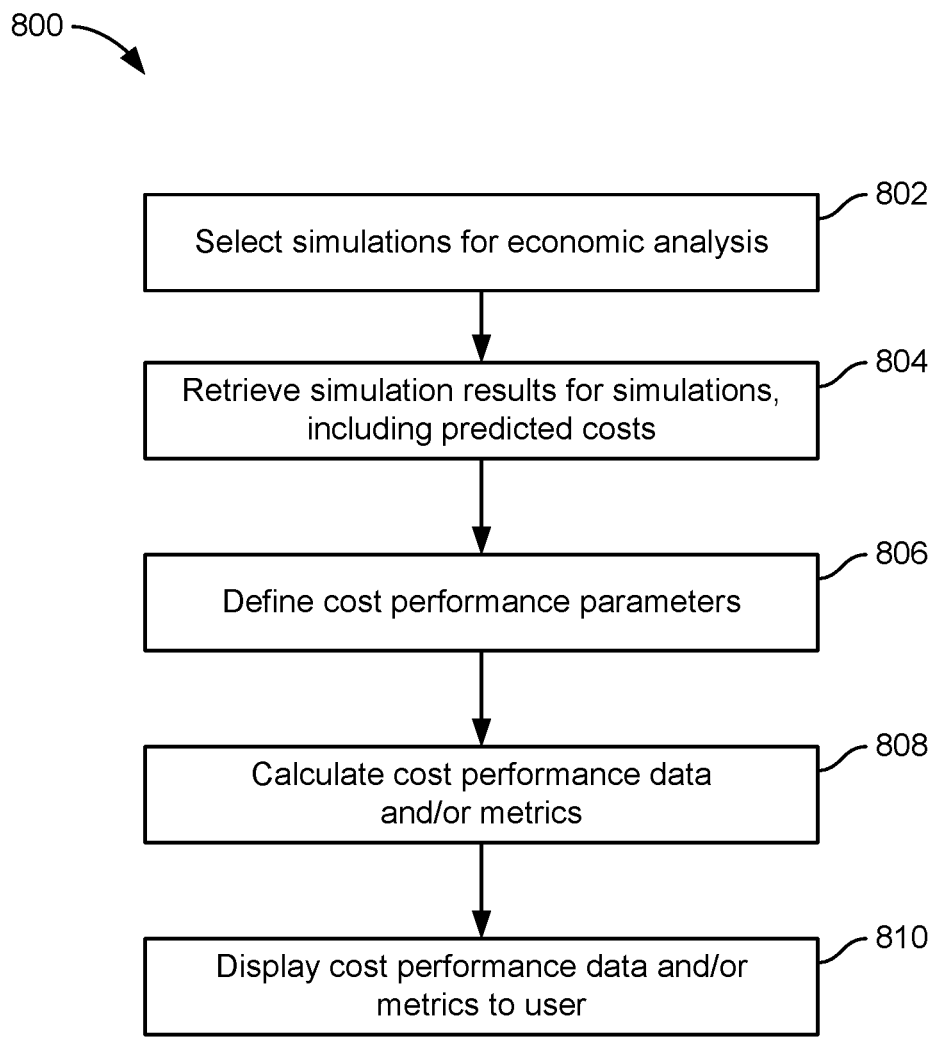
FIG. 8 is a flow diagram for analyzing the predictive financial performance of a plant design, according to some embodiments.

FIG. 8 depicts a process diagram 800 for generating and analyzing financial performance data, in accordance with some embodiments. Process 800 identifies one or more simulations for economic analysis (step 802) and retrieves predicted cost data from simulation results associated with the simulations (step 804), defines relevant expense and savings parameters (step 806), generates financial performance data for the identified simulations based on the defined parameters (step 808), and displays the resulting financial performance data to a user via a user interface (step 810). In some embodiments, process 800 is performed by financial performance analyzer 636. In some embodiments, process 800 is performed in step 712 of process 700.

In step 802, an indication to assess the economic feasibility of one or more simulation results is received. In some embodiments, a user makes the indication in a generated user interface, such as the Simulation Results screen of a Planning Tool platform. In some embodiments, the indication includes a request to compare two or more simulations in the same view or graphical element of the user interface. In other embodiments, all performed simulations are automatically selected for economic analysis.

In step 804, simulation data is retrieved for the one or more selected simulations. The simulation data can include any simulation data generated by the Simulation Engine. In some embodiments, the simulation data is retrieved from the demand response optimizer 630. In other embodiments, the simulation data is retrieved from results database 628. Retrieved simulation data may include a first-year operating cost of a simulated plant design. The simulation data may also include a predicted yearly operating cost or predicted yearly maintenance cost. In an example use case, the following values may be retrieved for a simulation:

| Initial Cost for Plant Design: | $3,000,000 |
|---|---|
| First Year Cost: | $ 174,436.93 |
| Estimated Economic Life (years): | 12 |

In step 806, parameters for economic analysis are defined. In some embodiments, a user selects which economic feasibility metrics to generate. In some embodiments, a graphical element in the user interface is generated to allow user input for choosing analysis parameters. In some embodiments, a user selects parameter values from a list of previously used or predetermined values. In other embodiments, a user inputs new values for analysis parameters. In some embodiments, the generated user interface allows a user to change and adjust analysis parameters so as to dynamically calculated economic feasibility metrics. In some embodiments, some or all of the analysis parameters are automatically generated or retrieved by the computing system. In some embodiments, the analysis parameters are retrieved from the simulation data. Step 806 may also define thresholds for financial performance metrics to indicate a favorable or acceptable plant design under the simulated scenario.

In some embodiments, a user can dynamically add or remove analysis parameters or cash flows for consideration in the economic analysis. For example, a user may wish to consider projected maintenance costs or some other cost in the feasibility analysis. In some such embodiments, the new analysis parameter or cash flow may be based on data available in the simulation data. In other such embodiments, the new analysis parameter or cash flow is not related to simulation data and must be estimated and input by the user. For example, a user may wish to consider maintenance costs in the economic analysis. Estimated maintenance costs may be generated as a part of the simulation data, or a user may be required to estimate the maintenance cost and input the estimation into the system. Separate cash flows may be added or removed by the user such that different time-phase rates can be used for different cash flow types.

In an example embodiment, a baseline cost is required to be defined, the baseline cost being a budget or current operating cost to which new plant design costs should be compared. A discount rate can be defined to convert future cash flows into a NPV. A savings escalation rate can be defined to predict future savings cash flows to future time intervals in time-phased calculations. A maintenance escalation rate can be defined to predict future maintenance costs, which can be a different rate than the savings escalation rate or the discount rate. Step 806 may also define a forecast period or evaluation period for economic analysis. In some embodiments, the evaluation period may be automatically defined based on the estimated usable life of the plant design. In some embodiments, the initial cost of a plant design or a plant design's estimated yearly cost can be input by a user rather than determined from the simulation data.

Thresholds for NPV, IRR, and payback period can be specified, and can be numerical or relative to other parameters. Example analysis parameters for an example use case may be:

| | |
|---|---|
| Baseline Cost/Yearly Budget: | $990,000 |
| Sayings Escalation Rate (%) | 15% |
| Maintenance Cost 1st Year: (Can be included in | 30000 |
| Maintenance Cost Escalation (%) | 2% |
| Discount Rate (%) | 10.0% |
| Evaluation Period (If defined separately than Estimated Economic Life) | 12 years |
| NPV Threshold | 0 |
| IRR Threshold | 10.0% |
| Payback Period Threshold: | Evaluation period |

At step 808, the financial performance data is calculated. The financial performance data can be any of the economic feasibility metrics or predictive financial data described herein, such as an NPV, IRR, payback period, and predicted cash flows. Step 808 may also compare a generated financial performance metric to a defined threshold to determine if the plant design is economically feasible, and generate additional data indicating the acceptability of the plant design. The acceptability data may, in some embodiments, be calculated as a combination of several economic feasibility metrics. In some embodiments, step 808 only indicates a plant design is acceptable if every economic feasibility metric passes its respective acceptability test. In an example use case, step 808 may generate the following financial performance data:

| | |
|---|---|
| Year One Savings: (Baseline - First Year Cost) | $ 815,563.07 |
| NPV: | $8,271,973.79 |
| Acceptable NPV? | Yes |
| IRR: | 38.682167% |
| Acceptable IRR? | Yes |
| Payback Period: | 3.82 years |
| Acceptable Payback Period? | Yes |

At step 810, the system displays the financial performance data to a user. A user can assess the results to determine if a modeled plant design associated with the simulation result can be considered as a viable solution. In some embodiments, financial performance data is displayed in data tables or graphs. In some embodiments, step 810 provides a graphical element in a user interface to display the financial performance data. In such embodiments, the graphical element may allow a user to select a "View Cash Flow" option to view cash flow data for one or more simulated models. In some embodiments, step 810 displays data for one more plant designs in the same graphical element so as to organize the multiple simulation results and compare the economic viability of multiple simulated plant designs.

Planning Tool User Interface

The Planning Tool 600 can generate various user interfaces for display to a user via computing device 622. The generated user interfaces can be used to implement the steps and functions of processes 700 and/or 800. Graphical user interfaces (GUI) can comprise graphical elements which display data to a user and can be configured to receive user input. A graphical user interface may be generally navigable via standard interface gestures, such as scrolling, panning, or zooming in or out in the display. The user interface may exist within a user application, including, but not limited to, an HTML browser, interne browser, local application, or other program. The user interface can display graphical elements in a separate window, pop-up, or panel.

Graphical elements can display data to a user in a variety of ways, such as, but not limited to, data tables or charts, graphs (e.g., pie graph, line graph, bar graph, data plot, etc)., symbols, stylistic differences (e.g., different colors, fonts, underline, embolding, highlighting, shapes, etc.), or any other graphical means to display data. Herein, data described to be included in the same graphical element implies data is displayed jointly, in close proximity, organized together, or otherwise displayed together. A graphical element can receive user input in a variety of ways, such as, but not limited to, text input, selection lists or menus, text search, slide bars, a selectable icon, button or symbol, or any other means of user input.

Referring now to FIG. 9-12, several examples of user interface 624 are shown, according to various embodiments. As discussed above, user interface 624 may be generated by planning tool 600 and displayed to a user via client device 622. Client device 622 may be a personal computer, laptop, smartphone, tablet, workstation, or any other type of suitable computing device. In some embodiments, planning tool 600 is implemented as a cloud-based SaaS (i.e., software as a service) application and can be accessed via an electronic network (e.g., via web services 614). Planning tool 600 may be used by personnel such as application engineers, commissioning engineers, and technicians to facilitate the design of a central plant. The example user interfaces of FIG. 9-12 are depicted to be illustrative and should not be regarded as strictly limiting. It should be appreciated that the various elements both included and not included in the different user interfaces can be rearranged, excluded, included, and otherwise transformed between the various examples without deviating from the scope of this disclosure.

Figure 9:
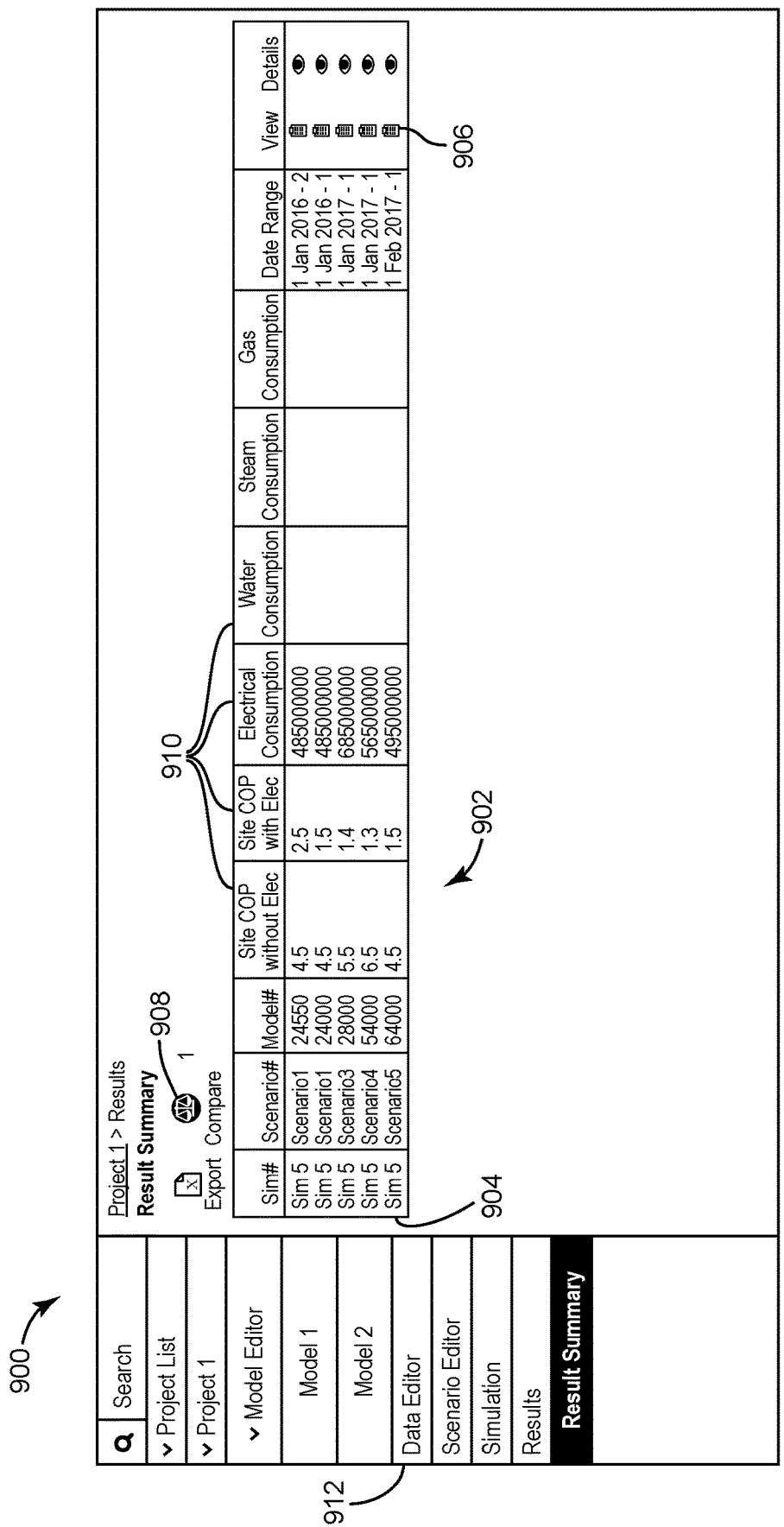
FIG. 9 is an illustration of a user interface associated with the planning tool of FIG. 6, according to some embodiments.

Referring now to FIG. 9, an example GUI 900 is shown. In some embodiments, GUI 900 is a simulation results summary display for various performed simulations. A graphical element 902 may identify and display the various performed simulations, such as simulation 904. A simulation may be identified by a simulation number, a model number and scenario number, or a user defined alias. Graphical element 902 may comprise simulation data 910 associated with its respective simulation and/or plant design. GUI 900 can comprise a selectable input, such as selectable icon 906 to indicate to display an economic feasibility analysis of a specified simulated plant design. Similarly, GUI 900 can also comprise a selectable icon 908 to indicate multiple simulations should be compared against each other based on their economic feasibility. Selectable inputs 906 and 908 can be displayed as their own graphical element, or embedded within another graphical element. GUI 900 can also contain element 912 to navigate between simulation results and user interfaces. In some embodiments, GUI 900 is used to implement step 802 and/or step 804 of process 800.

Referring now to FIG. 10, an example GUI 1000 is shown. In some embodiments, GUI 1000 is generated in response to selection of icons 906 and/or 908. In some embodiments, GUI 1000 is implemented to perform the function of step 806, 808 and/or 810 of process 800. GUI 1000 may generally define analysis parameters for generating financial performance metrics 1008. GUI 1000 may include data to identify the selected simulation such as element 1002. GUI 1000 may comprise graphical elements to accept user input for analysis parameters, such as text input 1004. GUI 1000 may also automatically define analysis parameters from the simulation data, such as in elements 1006. In some embodiments, GUI 1000 may allow a user to overwrite a value automatically defined from simulation data. In other embodiments, parameters derived from simulation data cannot be changed by a user directly. GUI 1000 can comprise a selectable element 1010 to initiate a calculation of financial performance metrics 1008. GUI 1000 can also include a selectable element 1012 to reset the economic feasibility analysis by deleting some or all of the analysis parameters. In some embodiments, the selection of element 1012 only deletes parameters defined by the user.

GUI 1000 may also comprise selectable elements to navigate between separate displays or windows. For example, GUI 1000 may contain selectable element 1014, which can be selected by a user to view additional financial performance data. In one example, selectable element 1014 allows a user to see predicted cash flow data for a given economic analysis. GUI 1000 may also contain a selectable element 1016 to return to a simulation results page, such as GUI 900, to select a different simulation for economic analysis.

Figure 11:
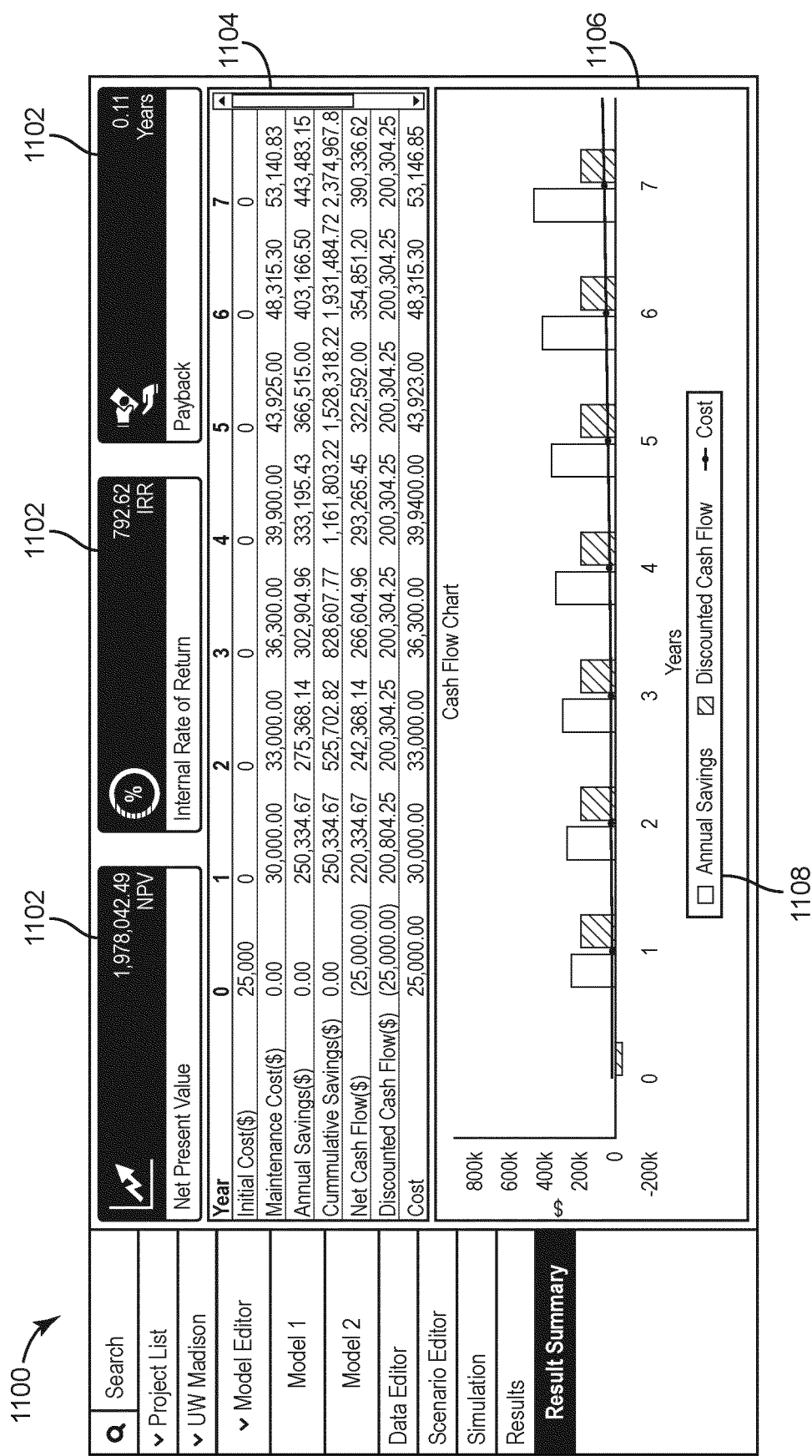
FIG. 11 is another illustration of a user interface associated with the planning tool of FIG. 6, according to some embodiments.

Referring now to FIG. 11, another example GUI 1100 is shown. GUI 1100 may comprise one or more financial performance metrics 1102, and thus can be used in some embodiments to perform the function of step 810 of process 800. Financial performance metrics can be the same or different than the financial performance metrics 1008. GUI 1100 may display predictive financial data in a graphical element, such as table 1104 or graph 1106. Table 1104 may be configured to display various time-phased or otherwise predicted financial data for one or more simulations. Graph 1106 may display predictive financial data in a bar graph or line graph. Graph 1106 may present different kinds of data in the same graph, as shown by legend 1108. In other embodiments, graph 1106 can show predictive financial data for two or more different simulations. Legend 1108 can be used to differentiate between the different types of data and/or associated simulations. Although not shown, GUI 1100 can also contain selectable icons to navigate between graphical elements or windows, similar to element 1014 and 1016.

Figure 12:
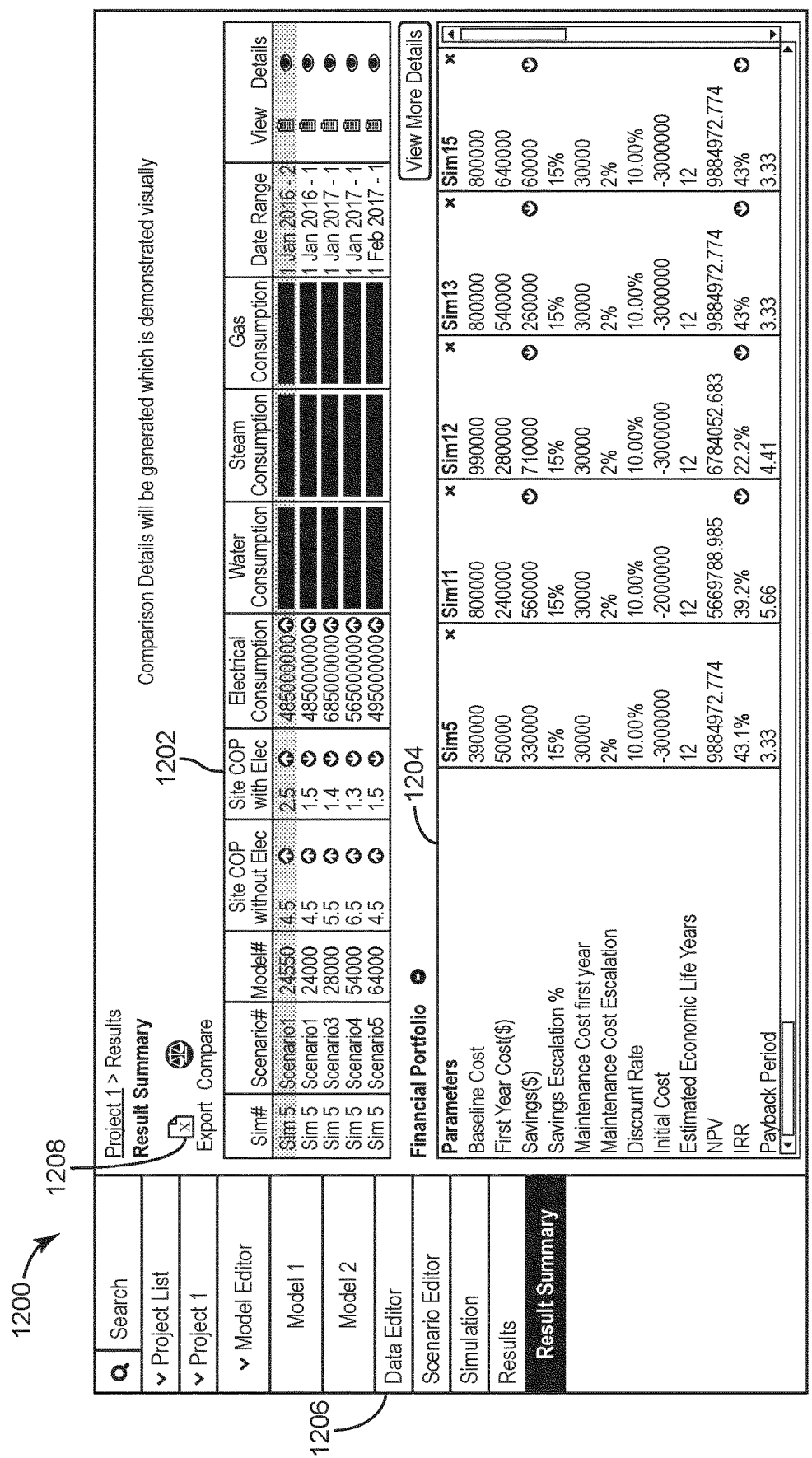
FIG. 12 is another illustration of a user interface associated with the planning tool of FIG. 6, according to some embodiments.

Referring now to FIG. 12, another example GUI 1200 is shown. In some embodiments, GUI 1200 can be used to compare the financial performance of different plant simulations. In some embodiments, GUI 1200 is generated in response to selection of icon 908 in GUI 900. GUI 1200 comprises a graphical element 1202 which contains simulation result data from one or more simulations, similar to element 902 of GUI 900. Graphical element 1202 may indicate which of a plurality of simulations has been selected by a user for comparison. GUI 1200 may output economic feasibility metrics in graphical element 1204. GUI 1200 can contain any elements for navigating with the planning tool, such as element 1206. Data presented in GUI 1200 may also be exported to an external system by selecting an icon 1208.

GUI 1200 also comprises graphical element 1204, which displays economic feasibility analyses of one or more plant design simulations. The data in graphical element 1204 can include both analysis parameters and financial performance data. In some embodiments, the displayed analysis parameters are configured to be defined or changed by a user for each simulation individually, or for a subset or group of simulations. In some embodiments, graphical element 1204 is a table with columns and rows, the columns associated with simulations and the rows associated with a type of data. Graphical element 1204 may organize the presented financial performance data according to the simulation, data type, associated plant design, or other distinction. Graphical element 1204 may present financial performance data in a style indicative of the economic feasibility of the simulated plant design. For example, an NPV value may be colored red if it does not meet the NPV threshold. In another example, an entire column associated with a simulation may be colored red if any one of the feasibility metrics is not acceptable. GUI 1200 may in some embodiments distinguish a simulation as the most optimal or feasible plant design based on the financial performance metrics.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system comprising:
one or more computer-readable storage media having instructions stored thereon that, when executed by one or more processors, cause the one or more processors to:
generate a first graphical element in a user interface, the first graphical element comprising a plurality of simulation results for a plurality of potential plant designs comprising a plurality of different sets of plant equipment and a plurality of different connections between the plant equipment;
receive a plurality of user inputs selecting a subset of the plurality of potential plant designs;
receive a user input from the user interface, the user input comprising an indication to evaluate data associated with the economic feasibility for the selected subset of the plurality of potential plant designs;
generate, responsive to the received user input, financial performance data associated with the subset of the plurality of potential plant designs, the financial performance data based at least in part on simulation data associated with the subset of the plurality of potential plant designs; and
generate a second graphical element in the user interface, the second graphical element comprising a visual representation of a comparison of the generated financial performance data between the potential plant designs of the subset of the plurality of potential plant designs.

2. The system of claim 1, wherein the financial performance data includes a Net Present Value, Internal Rate of Return, Payback period, or cash flow.

3. The system of claim 1, wherein the second graphical element presents the financial performance data in a chart, bar graph, or line graph.

4. The system of claim 1, wherein the simulation data comprises a principle cost or operating cost of the subset of the plurality of potential plant designs.

5. The system of claim 1, wherein the user input is a first user input, and the one or more processors are further caused to:
generate a third graphical element, the third graphical element configured to accept a second user input, the second user input comprising a value for an analysis parameter for generating the financial performance data.

6. The system of claim 5, wherein the analysis parameter is an evaluation period, baseline cost, required rate of return, discount rate, or escalation rate.

7. The system of claim 1, wherein the second graphical element further comprises comparison data, wherein the comparison data indicates if the financial performance data is greater than or less than a threshold value.

8. A method, comprising:
generating, by a computing device, a first graphical element in a user interface, the first graphical element comprising a plurality of simulation result for a plurality of potential plant designs comprising a plurality of different sets of plant equipment and a plurality of different connections between the plant equipment;
receiving a plurality of user inputs selecting a subset of the plurality of potential plant designs;
receiving a user input by the computing device, the user input comprising an indication to evaluate data associated with the economic feasibility for the selected subset of the plurality of potential plant designs;
generating, responsive to the received user input, financial performance data associated with the subset of the plurality of potential plant designs, the financial performance data based at least in part on simulation data associated with the subset of the plurality of potential plant designs; and
generating, by the computing device, a second graphical element in the user interface, the second graphical element comprising a visual representation of a comparison of the generated financial performance data between the potential plant designs of the subset of the plurality of potential plant designs.

9. The method of claim 8, wherein the financial performance data includes a Net Present Value, Internal Rate of Return, Payback period, or cash flow.

10. The method of claim 8, wherein the second graphical element presents the financial performance data in a chart, bar graph, or line graph.

11. The method of claim 8, wherein the simulation data comprises a principle cost or operating cost of the subset of the plurality of potential plant designs.

12. The method of claim 8, wherein the user input is a first user input, the method further comprising:
generating a third graphical element, the third graphical element configured to accept a second user input, the second user input comprising a value for an analysis parameter for generating the financial performance data.

13. The method of claim 12, wherein the analysis parameter is an evaluation period, baseline cost, required rate of return, discount rate, or escalation rate.

14. The method of claim 8, wherein the second graphical element further comprises comparison data, wherein the comparison data indicates if the financial performance data is greater than or less than a threshold value.

15. A system comprising:
one or more computer-readable storage media having instructions stored thereon that, when executed by one or more processors, cause the one or more processors to:
generate a first graphical element in a user interface, the first graphical element comprising a plurality of simulation results for a plurality of potential plant designs comprising a plurality of different sets of plant equipment and a plurality of different connections between the plant equipment;
receive a plurality of user inputs selecting a subset of the plurality of potential plant designs;
receive a first user input from the user interface, the first user input comprising an indication to evaluate data associated with the economic feasibility for the selected subset of the plurality of potential plant designs;
generate a third graphical element in the user interface, the third graphical element comprising a visual representation of a comparison of first financial performance data between the potential plant designs of the subset of the plurality of potential plant designs, the first financial performance data based at least in part on simulation data associated with the subset of the plurality of potential plant designs;
receive a second user input from the user interface, the second user input comprising a value for an analysis parameter, the analysis parameter being used to generate the first financial performance data;
generate, responsive to the received second user input, second financial performance data associated with the subset of the plurality of potential plant designs, the second financial performance data based at least in part on the value for the analysis parameter; and generate a fourth graphical element in the user interface, the fourth graphical element comprising the generated second financial performance data for the subset of the plurality of potential plant designs.

16. The system of claim 15, wherein the second financial performance data includes a Net Present Value, Internal Rate of Return, Payback period, or cash flow.

17. The system of claim 15, wherein the analysis parameter is an evaluation period, baseline cost, required rate of return, discount rate, or escalation rate.

18. The system of claim 15, wherein the analysis parameter is a first analysis parameter and the value of the analysis parameter is a first value, wherein the generated second financial performance data is based at least in part on the first value of the first analysis parameter and a second value of a second analysis parameter, the second value based on the simulation data for the subset of the plurality of potential plant designs.

* * * * *